US007617012B2

(12) United States Patent
Takemura et al.

(10) Patent No.: US 7,617,012 B2
(45) Date of Patent: Nov. 10, 2009

(54) AUDIO SIGNAL PROCESSING SYSTEM

(75) Inventors: Satoshi Takemura, Hamamatsu (JP); Mitsutaka Goto, Hamamatsu (JP); Makoto Hiroi, Hamamatsu (JP); Masahiro Shimizu, Hamamatsu (JP); Hiromu Miyamoto, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 549 days.

(21) Appl. No.: 11/067,539

(22) Filed: Feb. 25, 2005

(65) Prior Publication Data

US 2005/0195999 A1 Sep. 8, 2005

(30) Foreign Application Priority Data

Mar. 4, 2004 (JP) ............................ 2004-060839
Mar. 4, 2004 (JP) ............................ 2004-060847

(51) Int. Cl.
*G06F 17/00* (2006.01)

(52) U.S. Cl. ........................ 700/94; 381/119; 715/716; 715/727

(58) Field of Classification Search .................... 700/94
See application file for complete search history.

(56) References Cited

U.S. PATENT DOCUMENTS 5,402,501 A * 3/1995 Silfvajt et al. ............... 381/119
5,862,231 A * 1/1999 Tokuhisa ..................... 381/61
5,964,865 A * 10/1999 McCulloch et al. ........... 712/35
6,061,599 A * 5/2000 Rhodehamel et al. .......... 700/2
6,202,197 B1 * 3/2001 Robinson et al. .............. 716/17
6,470,380 B1 * 10/2002 Yoshizawa et al. .......... 709/213
6,564,112 B1 * 5/2003 Factor ......................... 700/97
6,611,537 B1 * 8/2003 Edens et al. ................ 370/503
6,651,225 B1 * 11/2003 Lin et al. ....................... 716/4
6,658,578 B1 * 12/2003 Laurenti et al. ............. 713/324
6,738,964 B1 * 5/2004 Zink et al. .................. 717/105
6,754,351 B1 * 6/2004 Tanji ........................... 381/61
6,754,763 B2 * 6/2004 Lin ............................ 710/317

(Continued)

FOREIGN PATENT DOCUMENTS

JP 07-168575 7/1995

(Continued)

OTHER PUBLICATIONS

"Owner's Manual for Digital Mixing Engine DME 32" by Yamaha Corporation, 2001.

*Primary Examiner*—Curtis Kuntz
*Assistant Examiner*—Paul McCord
(74) *Attorney, Agent, or Firm*—Morrison & Foerster LLP

(57) ABSTRACT

In a mixer system including: a plurality of mixer engines each provided with a programmable DSP; and a PC controlling operations of the respective mixer engines, the PC stores, as zone data, a plurality of configuration data each indicating a configuration of signal processing to be executed by one mixer engine or more out of the mixer engines under the control of the PC, accepts the selection of the zone data, and when the necessary mixer engines are in a controllable state, transfers data on a part of the aforesaid configuration which is to be assigned to each of the mixer engines, to the corresponding mixer engines. Then, when the selection of the configuration is accepted, each of the mixer engines to which the configuration is transferred is caused to execute the audio signal processing according to the selected configuration.

6 Claims, 15 Drawing Sheets

U.S. PATENT DOCUMENTS

| | | | | |
|---|---|---|---|---|
| 6,760,888 | B2 * | 7/2004 | Killian et al. | 716/1 |
| 6,810,442 | B1 * | 10/2004 | Lin et al. | 710/22 |
| 7,065,637 | B1 * | 6/2006 | Nanja | 713/1 |
| 7,078,608 | B2 * | 7/2006 | Aiso et al. | 84/625 |
| 7,139,624 | B2 * | 11/2006 | Terada et al. | 700/94 |
| 7,167,764 | B2 * | 1/2007 | Nakayama et al. | 700/94 |
| 2002/0112097 | A1 * | 8/2002 | Milovanovic et al. | 709/331 |
| 2002/0156547 | A1 * | 10/2002 | Suyama et al. | 700/94 |
| 2003/0184580 | A1 * | 10/2003 | Kodosky et al. | 345/734 |
| 2005/0066336 | A1 * | 3/2005 | Kavoori et al. | 719/321 |
| 2005/0102125 | A1 * | 5/2005 | Tseng | 703/14 |
| 2006/0117274 | A1 * | 6/2006 | Tseng et al. | 716/1 |

FOREIGN PATENT DOCUMENTS

| | | |
|---|---|---|
| JP | 2002-319915 | 10/2002 |

* cited by examiner

F I G. 5A
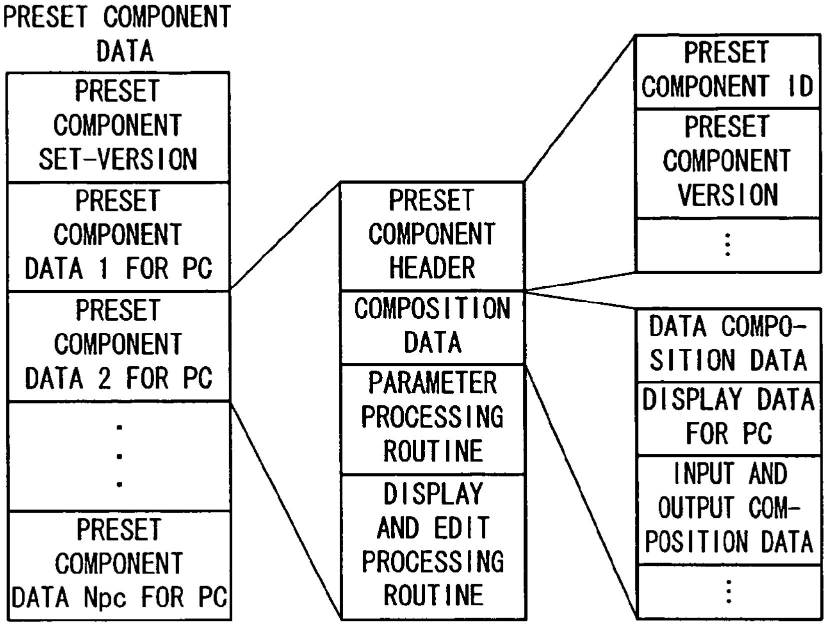
F I G. 5B
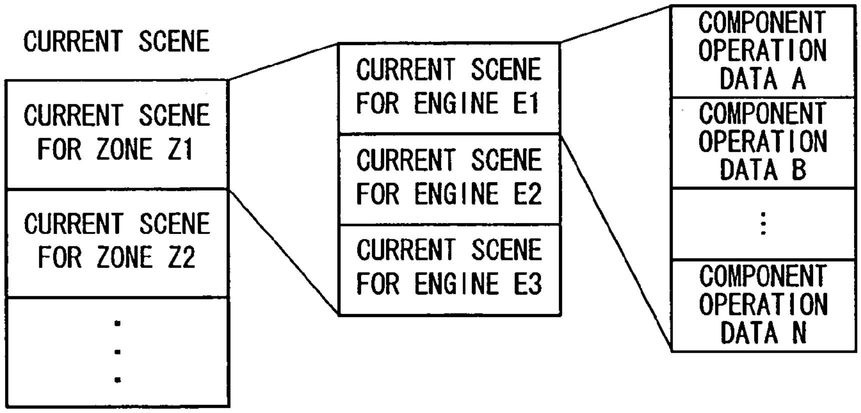
F I G. 5C
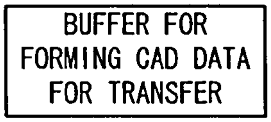
F I G. 5D
ENGINE INFORMATION
| ENGINE ID | IP ADDRESS |
|---|---|
| E1 | xxx. xxx. xxx. xxx |
| E2 | xxx. xxx. xxx. yyy |
| ⋮ | ⋮ |

AUDIO SIGNAL PROCESSING SYSTEM

BACKGROUND OF THE INVENTION

1. Field of the Invention

The invention relates to an audio signal processing device that processes audio signals according to a designated configuration of signal processing, and to an audio signal processing system that includes such an audio signal processing device and a controller controlling operation of the audio signal processing device.

2. Description of the Related Art

Conventionally, there has been a well-known audio signal processing device in which an audio signal processing module is composed using a processor operable following a program, and an external computer such as a PC (personal computer) or the like executes application software to function as an editing device so that audio signals can be processed based on a configuration of signal processing edited using the editing device. Such an audio signal processing device is called a mixer engine in the present application. The mixer engine stores therein the configuration of signal processing edited by the PC and can independently perform processing on audio signals based on the stored configuration of signal processing.

For the edit of the configuration of signal processing on the editing device, the components being constituent elements for the signal processing in editing and a wiring status between their input and output nodes are graphically displayed on an edit screen of a display to allow users to perform editing work in an environment where the configuration of signal processing can be easily grasped visually. Then, a user can arrange desired processing components and set wires between the arranged components, thereby editing the configuration of signal processing. Further, the editing device functions as a controller controlling the mixer engine in such a manner that it is provided with a function of performing operations such as transferring data indicating the edited configuration of signal processing to the mixer engine to thereby cause the mixer engine to process audio signals according to the configuration of signal processing.

Further, when a capacity of one mixer engine is not enough for the audio signal processing, the plural mixer engines are cascaded to cooperatively execute the audio signal processing, and the aforesaid editing device edits a configuration of such signal processing. In this case, in order to cause each of the mixer engines to execute the audio signal processing according to the edited configuration of signal processing, the editing device transfers data indicating the edited configuration of signal processing to each of the mixer engines.

The mixer engine and application software described above are described, for example, in Owner's Manual of a digital mixing engine "DME32 (trade name)" available from YAMAHA Co., especially pp. 23 to 66 (pp. 21 to 63 in English version).

SUMMARY OF THE INVENTION

However, the cascade connection as described above only enables the cooperative operation of all the connected mixers. That is, it is not possible to divide the connected mixer engines into a plurality of groups so that each group operates separately. Therefore, cooperative operation of mixer engines arbitrarily selected from a large number of connected mixer engines is not possible. This necessitates physically changing the connections when the range of the engines that are to cooperatively operate is changed. However, this work takes a lot of trouble, which has given rise to a demand for enhanced easiness in changing the range of the engines to be used.

As a system responding to such a demand, also well known is a mixer system in which an editing device having a control function and a plurality of mixer engines are connected via a network, and part of the mixer engines are selected therefrom, thereby realizing cooperative operation of the selected mixer engines.

In such a mixer system, however, data on the configuration of signal processing includes identifiers of the mixer engines necessary for executing audio signal processing according to this configuration of signal processing. Then, when execution of audio signal processing according to a given configuration of signal processing is instructed in the editing device, it is confirmed that the mixer engines necessary for this processing are connected to the editing device, and the data indicating the configuration of signal processing is transmitted to the engines whose connection is confirmed.

Thus, in such a mixer system, the connection of appropriate mixer engines has to be confirmed every time the configuration of signal processing is changed, which has posed a problem that it takes a long time to change the configuration of signal processing. Moreover, since it is not possible to divide the connected mixer engines into groups to use them for two purposes or more in parallel, the engines not in use are simply left idle. This has posed another problem that the merit brought by the selective use of part of the mixer engines cannot be sufficiently made use of.

It is an object of the present invention to solve the above problems to provide an audio signal processing system including: a plurality of audio signal processing devices each processing audio signals according to a designated configuration of signal processing; and a controller controlling operations of the respective audio signal processing devices, in which the cooperative operation of any combination of the audio signal processing devices in the system is realized while maintaining operability.

Further, as a method of setting the contents of the configuration of signal processing in the mixer engine as described above, the assignee has proposed a method in which an editing device edits configuration data indicating the arrangement of components and wires, converts the edited configuration data to data for engine, and transfers it to a mixer engine, thereby causing the mixer engine to execute audio signal processing based on this data (Japanese Patent Application No. 2003-368691, not laid open). In this method, the mixer engine stores the plural configuration data, which allows a user to selectively use these configuration data as desired.

In this method, operation data indicating values of parameters that are used in executing audio signal processing according to each configuration data are stored in the mixer engine in association with the configuration data, and when the audio signal processing according to each configuration data is to be executed, the selection of the operation data is accepted from a user, and the audio signal processing is executed, following the values indicated by the operation data.

In such a method, however, in order to change the configuration of audio signal processing executed in the mixer engine to another configuration stored in advance, the user needs to first select new configuration data and thereafter select the operation data indicating the values of the parameters used for the processing.

Therefore, the change requires operations of selecting two kinds of data in sequence, resulting in a problem of low operability. Moreover, even if the mixer engine is capable of quickly executing the audio signal processing according to the new configuration data, the mixer engine cannot execute the signal processing desired by the user until the user selects the operation data. This poses a limit on improvement in responsiveness in changing the configuration of signal processing, and thus there has been another problem that a demand for changing the configuration of signal processing without interrupting audio signal processing cannot be fully satisfied.

It is another object of the invention to solve the above problems to provide an audio signal processing device including a signal processor that executes audio signal processing according to a designated configuration of signal processing, in which operability and responsiveness in changing the configuration of signal processing are improved.

To achieve the above objects, an audio signal processing system of the invention is an audio signal processing system including: a plurality of audio signal processing devices each processing an audio signal according to a designated configuration of signal processing; and a controller controlling operations of the respective audio signal processing devices, wherein the controller includes: a memory that stores, as each of a plurality of zone data, specifying data and a plurality of configuration data in association with each other, the specifying data specifying one audio signal processing device or more out of the audio signal processing devices, and each of the plural configuration data indicating the configuration of signal processing to be executed by the specified audio signal processing device; a first accepting device that accepts selection of the zone data; a checking device that checks, in response to the acceptance of the selection of the zone data by the first accepting device, that the audio signal processing device specified by the specifying data in the selected zone data is controllable based on the selected zone data; a transferring device that transfers partial configuration data included in each of the configuration data to the audio signal processing device that is confirmed as controllable by the checking device, the partial configuration data indicating a part of the configuration of signal processing, which is assigned to the confirmed audio signal processing device; a second accepting device that accepts, while the zone data is in a selected state, selection of the configuration data included in the selected zone data; and an instructing device that, in response to the acceptance of the selection of the configuration data by the second accepting device, instructs the audio signal processing device specified by the specifying data included in the selected zone data to execute the audio signal processing according to the selected configuration data, and wherein each of the audio signal processing devices includes: a memory that stores the partial configuration data transferred from the controller; and a processor that, in response to the instruction by the controller to execute the audio signal processing according to given configuration data, executes the audio signal processing according to the partial configuration data corresponding to the given configuration data.

Another audio signal processing system of the invention is an audio signal processing system including: a plurality of audio signal processing devices each processing an audio signal according to a designated configuration of signal processing; and a controller controlling operations of the respective audio signal processing devices, wherein the controller includes: a memory that stores, as each of a plurality of zone data, specifying data, configuration data, a plurality of operation data in association with one another, the specifying data specifying one audio signal processing device or more out of the audio signal processing devices, the configuration data indicating the configuration of signal processing to be executed by the specified audio signal processing device, and each of the plural operation data indicating a value of a parameter used in executing the audio signal processing according to the configuration of signal processing indicated by the configuration data; a first accepting device that accepts selection of the zone data; a checking device that checks, in response to the acceptance of the selection of the zone data by the first accepting device, that the audio signal processing device specified by the specifying data in the selected zone data is controllable based on the selected zone data; a transferring device that transfers partial configuration data included in the configuration data and partial operation data included in the operation data to the audio signal processing device that is confirmed as controllable by the checking device, the partial configuration data indicating a part of the configuration of the signal processing, which is assigned to the relevant audio signal processing device, and the partial operation data indicating a value of a parameter used in executing a part of the audio signal processing, which is assigned to the relevant audio signal processing device; a second accepting device that accepts, while the zone data is in a selected state, selection of the operation data included in the selected zone data; and an instructing device that, in response to the acceptance of the selection of the operation data by the second accepting device, instructs the audio signal processing device specified by the specifying data included in the selected zone data to execute the audio signal processing according to the configuration data corresponding to the selected operation data, using the parameter indicated by the selected operation data, and wherein each of the audio signal processing devices includes: a memory that stores the partial configuration data and the partial operation data transferred from the controller; and a processor that, in response to the instruction by the controller to execute the audio signal processing according to given configuration data and operation data, executes the audio signal processing according to the partial configuration data corresponding to the given configuration data, using the value of the parameter indicated by the partial operation data corresponding to the given operation data.

In each of the above-described audio signal processing systems, preferably, the controller includes an alarm device that alarms a user of an uncontrollable state when at least one of the audio signal processing devices specified by the specifying data in the zone data whose selection is accepted is not controllable based on the selected zone data.

An audio signal processing device of the invention is an audio signal processing device provided with a signal processor executing audio signal processing according to a designated configuration of signal processing, and the device including: a configuration data memory that stores a plurality of configuration data each indicating contents of the configuration of signal processing; an operation data memory that stores, in association with each of the configuration data, a plurality of operation data each indicating a value of a parameter used in executing the audio signal processing according to the configuration of signal processing indicated by the corresponding configuration data; a scene data memory that stores a plurality of scene data each including first specifying data specifying one piece of the configuration data and second specifying data specifying one piece of the operation data; an accepting device that accepts an instruction that one piece of the scene data should be recalled from the scene data memory; and a controller that, in response to the acceptance of the recall instruction by the accepting device, causes the signal processor to execute audio signal processing indicated by the configuration data specified by the first specifying data included in the scene data whose recall is instructed, and supplies the signal processor with the value of the parameter indicated by the operation data specified by the second specifying data included in the scene data whose recall is instructed, as a value of a parameter for the audio signal processing.

Another audio signal processing device of the invention is an audio signal processing device provided with a signal processor executing audio signal processing according to a designated configuration of signal processing, and the device including: a configuration data memory that stores a plurality of configuration data each indicating contents of the configuration of signal processing; an operation data memory that stores, in association with each of the configuration data, a plurality of operation data each indicating a value of a parameter used in executing the audio signal processing according to the configuration of signal processing indicated by the corresponding configuration data; a scene data memory that stores a plurality of scene data each including first specifying data specifying one piece of the configuration data stored in the configuration data memory and second specifying data specifying one piece of the operation data stored in the operation data memory; a controller causing the signal processor to execute the audio signal processing indicated by current configuration data selected from the plural configuration data stored in the configuration data memory; a current memory that stores operation data indicating a value of a parameter for the audio signal processing according to the configuration of signal processing indicated by the current configuration data; an operation data supplier that supplies the operation data stored in the current memory to the signal processor executing the audio signal processing; an accepting device that accepts a store instruction that one piece of scene data should be stored in the scene data memory; and a scene storer that operates in response to the acceptance of the store instruction by the accepting device in such a manner that: when the operation data stored in the current memory is stored in the operation data memory in association with the current configuration data, the storer causes the scene data memory to store the first specifying data specifying the current configuration data and the second specifying data specifying the operation data stored in the operation data memory, while, when otherwise, the scene storer causes the operation data memory to additionally store the operation data stored in the current memory as new operation data, and causes the scene data memory to store the first specifying data specifying the current configuration data and second specifying data specifying the additionally stored operation data.

The above and other objects, features and advantages of the invention will be apparent from the following detailed description which is to be read in conjunction with the accompanying drawings.

BRIEF DESCRIPTION OF THE DRAWINGS

FIG. 5A to FIG. 5D are diagrams showing part of a composition of data stored in the PC side, out of data involved in the invention;

DETAILED DESCRIPTION OF THE PREFERRED EMBODIMENTS

Hereinafter, preferred embodiments of the invention will be concretely described with reference to the drawings.

1 Description of a Basic Configuration of a Mixer System in a First Embodiment: FIG. 1 to FIG. 4

Figure 1:
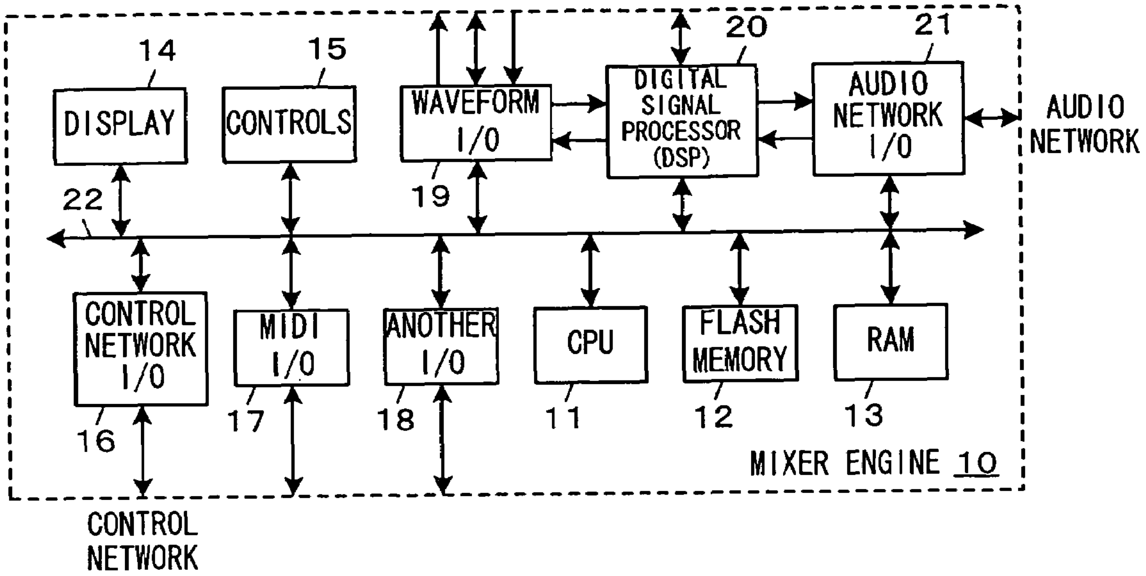
FIG. 1 is a block diagram showing a configuration of a mixer engine which is an audio signal processing device constituting a first embodiment of the audio signal processing system of the invention.

First, FIG. 1 is a block diagram showing a configuration of a mixer engine which is an audio signal processing device constituting the first embodiment of the audio signal processing system of the invention.

As shown in FIG. 1, a mixer engine 10 includes a CPU 11, a flash memory 12, a RAM 13, a display 14, controls 15, a control network input/output (I/O) 16, a MIDI (Musical Instruments Digital Interface) I/O 17, another I/O 18, a waveform I/O 19, a digital signal processor (DSP) 20, and an audio network I/O 21, which are connected by a system bus 22. The mixer engine 10 has functions of generating a microprogram for controlling the DSP 20 in accordance with a configuration of signal processing received from a controller communicatable via a control network, operating the DSP 20 in accordance with the microprogram to thereby perform various signal processing on inputted audio signals and output them.

The CPU 11, which is a controller that comprehensively controls operation of the mixer engine 10, executes a predetermined program stored in the flash memory 12 to thereby perform processing such as controlling communication at each of the I/Os 16 to 19, 21 and display on the display 14, detecting operations at the controls 15 and changing values accordance with the operations, and generating the microprogram for operating the DSP 20 from data on the configuration of signal processing received from the controller and installing the program in the DSP 20.

The flash memory 12 is a rewritable non-volatile memory that stores a control program executed by the CPU 11, later-described preset component data and so on.

The RAM 13 is a memory that stores data on the configuration of signal processing received from the controller as later-described configuration data, and stores various kinds of data such as current data, and is used as a work memory by the CPU 11.

The display 14 is a display composed of a liquid crystal display (LCD) or the like. The display 14 displays a screen for indicating the current state of the mixer engine 10, a screen for referring to, modifying, saving, and so on of scenes being setting data contained in the configuration data, and so on.

The controls 15 are controls composed of keys, switches, rotary encoders, and so on, with which a user directly operates the mixer engine 10 to edit scenes and so on.

The control network I/O 16 is an interface for connecting the mixer engine 10 to a later-described control network for communication, and capable of establishing communication via an interface of, for example, a USB (Universal Serial Bus) standard, an RS-232C standard, an IEEE (Institute of Electrical and Electronic Engineers) 1394 standard, an Ethernet (registered trademark) standard, or the like.

The MIDI I/O 17 is an interface for sending and receiving data in compliance with MIDI standard, and is used, for example, to communicate with an electronic musical instrument compatible with MIDI, a computer with an application program for outputting MIDI data, or the like.

The waveform I/O 19 is an interface for accepting input of audio signals to be processed in the DSP 20 and outputting processed audio signals. A plurality of A/D conversion boards each capable of analog input of four channels, D/A conversion boards each capable of analog output of four channels, and digital input and output boards each capable of digital input and output of eight channels, can be installed in combination as necessary into the waveform I/O 19, which actually inputs and outputs signals through the boards.

The another I/O 18 is an interface for connecting devices other than the above-described to perform input and output, and for example, interfaces for connecting an external display, a mouse, a keyboard for inputting characters, a control panel, and so on are provided.

The DSP 20 is a module which processes audio signals inputted from the waveform I/O 19 in accordance with the set microprogram and the current data determining its processing parameters. The DSP 20 may be constituted of one processor or a plurality of processors connected.

The audio network I/O 21 is an interface for connecting the mixer engine 10 to a later-described audio network to exchange audio signals with other mixer engines 10 when the plural mixer engines 10 are connected for use. The same communication standard as that of the control network I/O 16 may be adopted. However, the audio network includes a mechanism of isochronous transfer for transferring audio signals in real time, so that the mixer engine 10 is capable of outputting a plurality of audio signals to other devices from its audio network output nodes. Moreover, a plurality of audio signals can be inputted from other devices to audio network input terminals of the mixer engine 10.

Figure 2:
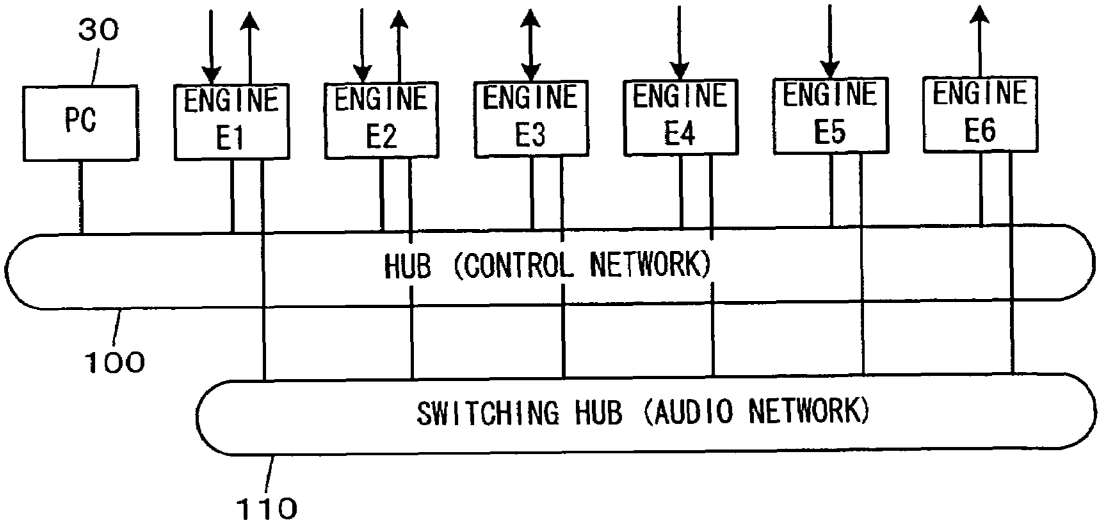
FIG. 2 is a diagram showing a configuration of a mixer system which is an embodiment of the audio signal processing system of the invention.

Next, FIG. 2 shows a configuration of a mixer system, which is an embodiment of the audio signal processing system of the invention, constituted of mutually connected mixer engines as configured above and PC being a controller.

As shown in FIG. 2, in this mixer system, a PC 30 and engines E1 to E6, which are mixer engines each having the configuration shown in FIG. 1, are connected via the control network constituted of a hub 100, so that they are capable of mutually communicating. Besides, the engines are connected to one another via the audio network constituted of a switching hub 110, so that they are capable of mutually communicating.

The PC 30 is a known PC having a CPU, a ROM, a RAM, and so on, and a display as a display device as hardware. As the PC 30, a PC on which an operating system (OS) such as Windows XP (registered trademark) runs is usable. The PC 30 executes a desired control program as an application program on the OS, so that it is capable of functioning as a controller editing a configuration of signal processing to be executed in the mixer engine 10, transferring the result of the editing to the mixer engines 10, causing the mixer engines 10 to operate according to the edited configuration of signal processing, and issuing commands of operation instructions to the mixer engines 10. Note that the operations and functions of the PC 30 to be described below are realized by the execution of this control program unless otherwise noted.

When the plural mixer engines are connected for use as shown in FIG. 2, the plural mixer engines are put into cooperative operation so that a series of audio signal processing can be executed. The PC 30 edits the configuration of such audio signal processing and transfers the result of the editing to each of the mixer engines via the control network, so that it is capable of operating the mixer engines 10 according to the edited configuration of signal processing.

At this time, audio signals are exchanged among the mixer engines via the audio network. In this mixer system, cooperative operation of any combination of the mixer engines is also possible as will be later described. When the plural mixer engines 10 are divided into a plurality of groups (zones) so that they operate group by group, they are operated in an environment in which the audio network is divided into a plurality of partial networks each allotted to each zone as a VLAN (virtual LAN) through the function of the switching hub 110. This allows all bands of communication to be used in each zone. The audio network is divided into the VLANs according to the contents of zone data to be described later.

It is a matter of course that the use of the hub 100 and the switching hub 110 for constituting the control network and the audio network is not essential, but other hardware may be used for constituting these networks.

Further, the control network and the audio network are separately provided here, but this is not essential if a network has a speed high enough for the number of the connected mixer engines. For example, the PC 30 may also be connected to the switching hub 110 so that the two networks are constituted using the same switching hub 110. However, when a large number of the mixer engines are connected, there may be a case where lack of communication bands occurs, and thus the configuration shown in FIG. 2 is preferable.

Figure 3:
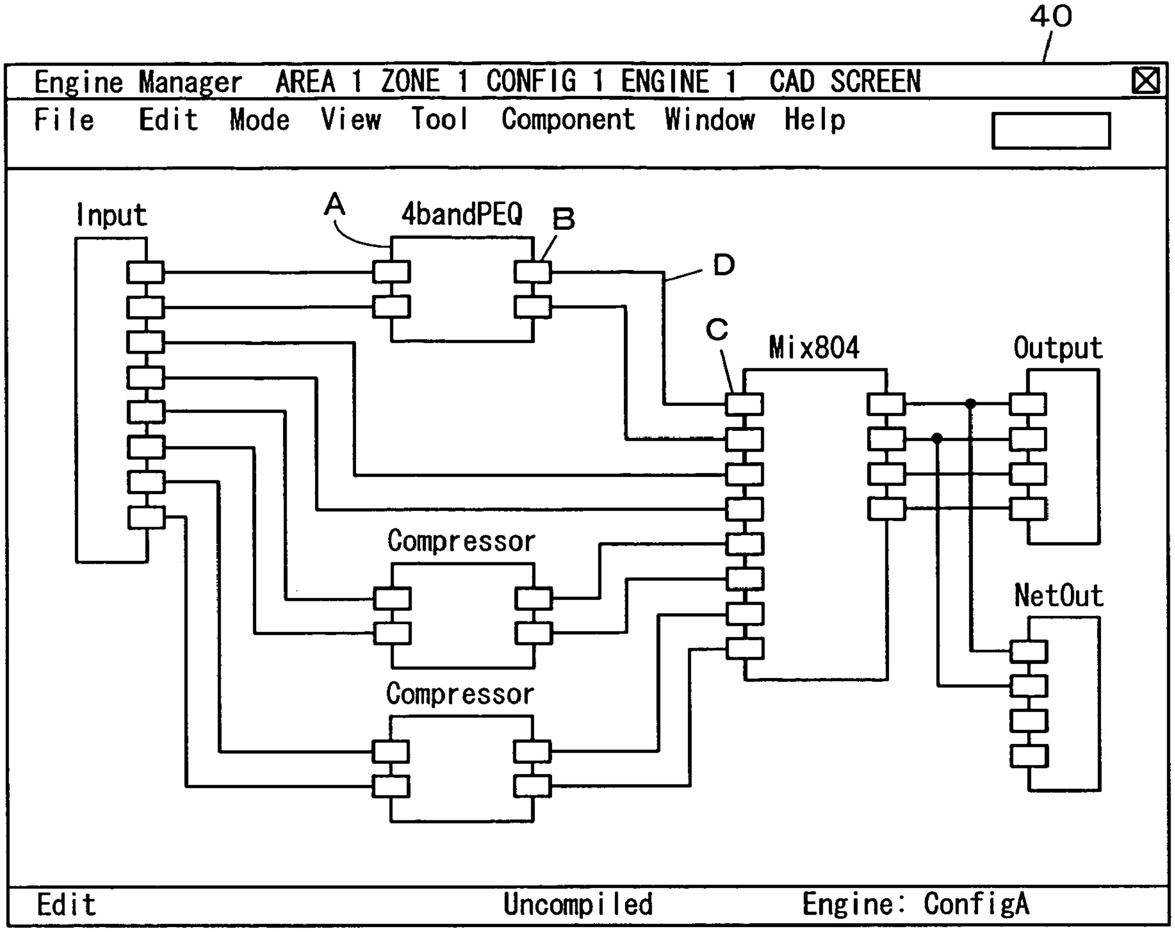
FIG. 3 is a view showing an example of an edit screen of a configuration of signal processing, which is displayed on a display of a PC shown in FIG. 2.
Figure 4:
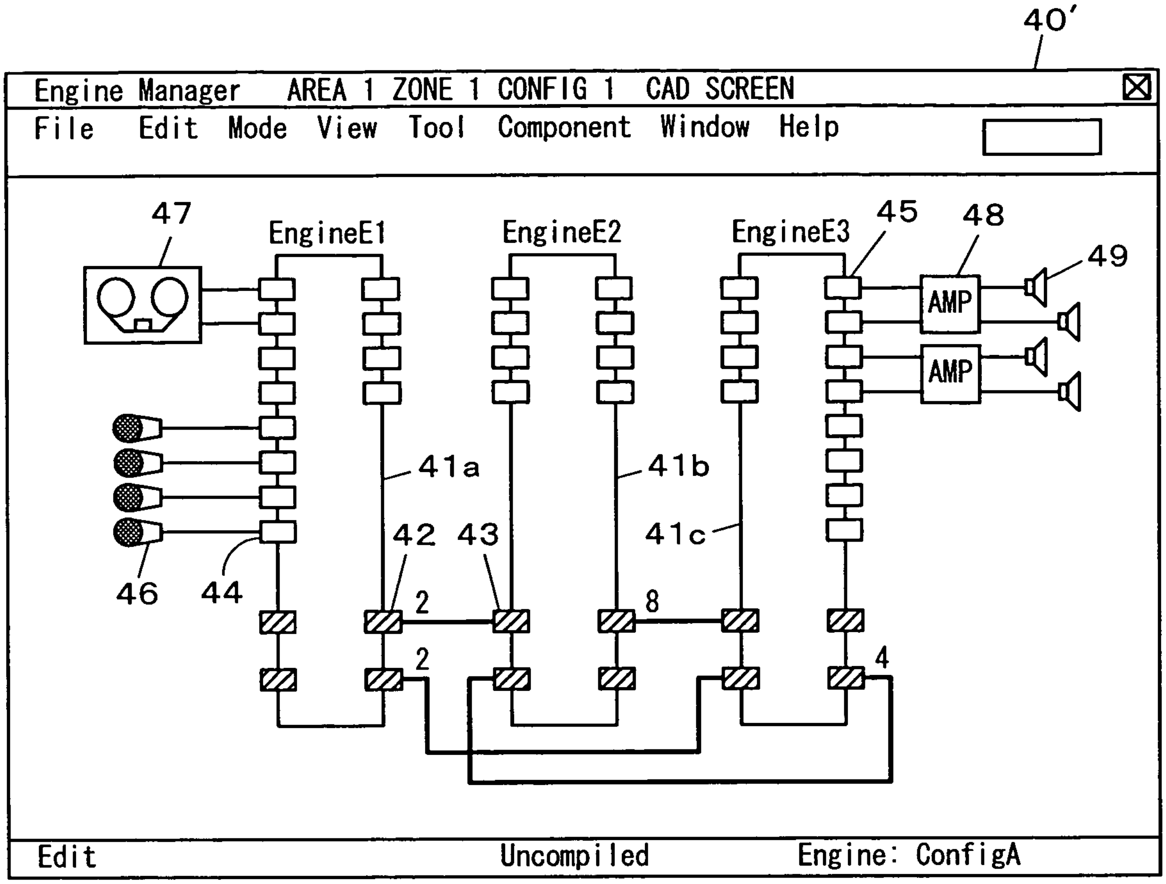
FIG. 4 is a view showing another example of the same.

Next, an editing scheme of the configuration of signal processing in the PC 30 will be described. FIG. 3 and FIG. 4 are diagrams showing examples of an edit screen of the configuration of signal processing displayed on the display of the PC 30.

When the user causes the PC 30 to execute the above-described edit/control program, the PC 30 causes the display to display a CAD (Computer Aided Design) screen 40 as shown in FIG. 3 as a graphical screen to accept an edit direction from the user. In this screen, the configuration of signal processing during the edit is graphically displayed by components (A) such as a 4band PEQ, and Compressors, and a Mix804, and wires (D) connecting output nodes (B) and input nodes (C) of the components.

Note that the nodes displayed on the left side of the components are the input nodes, and the nodes displayed on the right side are the output nodes. The components which exhibit input to the mixer engine 10 have only the output nodes, the components which exhibit output from the mixer engine 10 have only the input nodes, and all the other components have both the input nodes and the output nodes.

In this screen, the user can select components desired to be added to the configuration of signal processing from a component list displayed by operation of a "Component" menu, arrange them on the screen, and designate wires between any of the output nodes and any of the input nodes of the plurality of components arranged, to thereby edit the configuration of signal processing.

Here, nodes of an Input component and an Output component represent input and output channels of the waveform I/O 19, and nodes of a NetOut component represent signal outputs from the audio network I/O 21 to other mixer engines via the audio network. Further, a NetIn component, though not shown here, representing signal input from other mixer engines via the audio network can be arranged.

When the configuration of signal processing to be executed by the cooperative operation of the plural mixer engines is edited, the CAD screen 40 is displayed for each mixer engine, thereby allowing the edit of the configuration of signal processing of each engine.

As for the mutual connection relation of the engines, another CAD screen 40' as shown in FIG. 4 is displayed for editing this. This screen displays mixer components 41*a*, 41*b*, 41*c* representing the mixer engines that are to execute the audio signal processing according to the configuration of signal processing that is currently being edited, and each of the mixer components has at the bottom thereof network output nodes 42 and network input nodes 43, which are hatched in the drawing, representing input and output of signals via the audio network.

By designating wires between these nodes as is done in the CAD screen 40, the user can designate signal output destinations from the aforesaid NetOut component and signal input origins to the aforesaid NetIn component of each of the mixer engines. At this time, the user can also designate wiring such that a signal is inputted from one of the network output nodes 42 to the plural network input nodes 43. It is also possible to designate for each wire the number of channels of audio signals transmitted through the wire. The number shown for each wire near the network output node 42 corresponds to the number of channels, and the total number of channels that can be concurrently inputted and outputted in each engine is restricted by input and output capacities of the audio network I/O 21, for example, by the number of input terminals and the number of output terminals thereof.

Each mixer component has, above the network input and output nodes, input nodes 44 and output nodes 45 representing input and output channels in the waveform I/O 19 of each mixer engine. For these nodes, external devices to be connected to the mixer system can be set, using microphone symbols 46, deck symbols 47, amplifier symbols 48, speaker symbols 49, and so on. However, this setting is only something like a memorandum and does not influence the operation of the mixer system. That is, even if actually connected devices do not match the symbols, signals are inputted/outputted from the connected devices.

By directing execution of "Save" in a "File" menu, the edit result in each of the CAD screens as described above is saved as a configuration (config). Further, by directing execution of "Compile" in the "File" menu, the data format of a part of the configuration data can be converted into the data format for the mixer engine, and then the configuration data can be transferred to and stored in the mixer engine 10.

Note that the PC 30 calculates during the edit the amount of resources required for the signal processing in accordance with the configuration of signal processing on the screen, so that if the amount exceeds that of the resource of the DSP 20 included in the mixer engine 10, the PC 30 informs the user that such processing cannot be performed.

Further, for each of the components included in the configuration of signal processing, a storage region for storing parameters (for example, the level of each input or the like if it is a mixer) of the component is prepared, when the component is newly disposed and compiled in the configuration of signal processing, in the current scene where the current data is stored, and predetermined initial values are given as the parameters.

Then, the user can edit the parameters stored in the parameter storage region by operating a parameter control panel provided for each component. Further, values of parameters edited and stored in the current scene here are stored as a plurality of preset operation data corresponding to the configuration, so that any of the parameters can be recalled along with the configuration when the mixer engine 10 is caused to execute signal processing. This respect will be described later in detail.

2. Configuration of Data Used in the Mixer System of the First Embodiment: FIG. 5A to FIG. 9

The configuration of data associated with the invention for use in the above-described mixer system will be described below.

Figure 6:
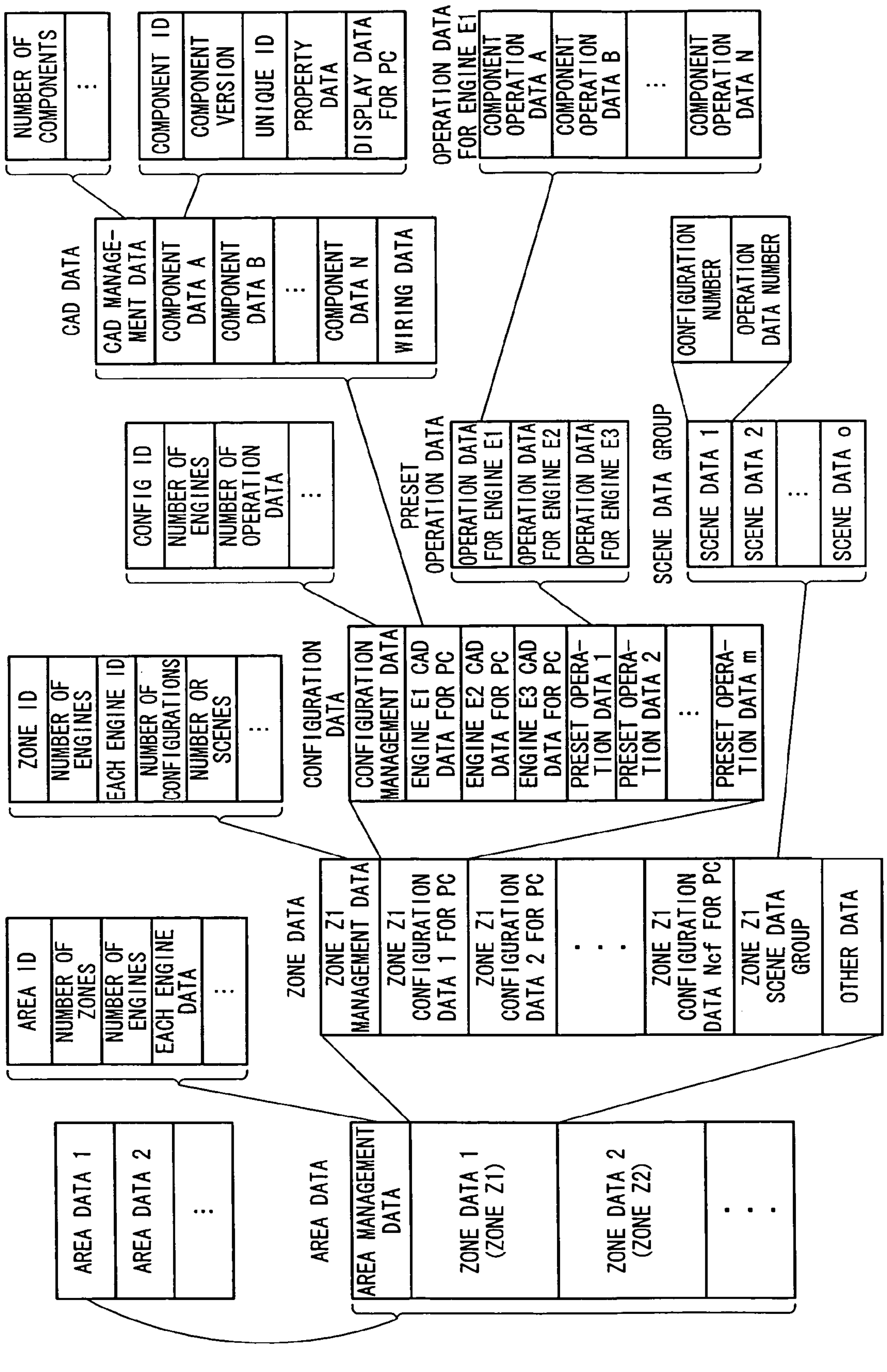
FIG. 6 is diagram showing another part of the same.

First, the configuration of data for use in the PC 30 side will be shown in FIG. 5A to FIG. 6.

When the above-described edit/control program is executed on the OS of the PC 30, the PC 30 stores respective data shown in FIG. 5A to FIG. 6 in a memory space defined by the control program.

Of them, the preset component data shown in FIG. 5A is a set of data on components which can be used in editing signal processing and basically supplied from their manufacturer, although it may be configured to be customizable by the user. The preset component data includes data of preset component set-version being version data for managing the version as the whole data set, and preset component data for PC prepared for each kind of the plurality of components constituting the data set.

Each preset component data for PC, which is data indicating the property and function of a component, includes: a preset component header for identifying the component; composition data showing the composition of the input and output of the component and data and parameters that the component handles; a parameter processing routine for performing processing of changing the value of the individual parameter of each component in the aforesaid current scene or later described preset operation data, in accordance with the numerical value input operation by the user; and a display and edit processing routine for converting, in the above processing, the parameters of each component into text data or a characteristic graph for display.

The preset component header includes data on a preset component ID indicating the kind of the preset component and a preset component version indicating its version, with which the preset component can be identified.

The above-described composition data also includes: the name of the component; display data for PC indicating the appearance such as color, shape, and so on of the component when the component itself is displayed in the edit screen, the design of the control panel displayed on the display for editing the parameters of that component, and the arrangement of knobs and the characteristic graph on the control panel; and so on, as well as the input and output composition data indicating the composition of the input and output of the component, and the data composition data indicating the composition of data and parameters that the component handles.

Among the preset component data for PC, the display data for PC necessary for editing in the edit screen in graphic display in the composition data, the routine for displaying the characteristics in a graph form on the control panel in the display and edit processing routine, and so on, which are not required for the operation on the mixer engine 10 side, are stored only in the PC 30 side.

Meanwhile, area data shown in FIG. 6 is data indicating the configuration of the mixer system shown in FIG. 2 and the configuration of signal processing to be executed in the mixer system, and various settings and data are written therein over a large number of hierarchies. The PC 30 is capable of storing the area data in plurality.

Each area data is data indicating data on an "area" constituted of all the mixer engines under the control of the PC 30. As shown in FIG. 6, each area data includes area management data and one piece of zone data or more. Of them, each zone data is data that defines as a "zone" a group of one mixer engine or more out of the mixer engines belonging to the "area", and indicates the contents of signal processing to be executed by the mixer engine or mixer engines in the zone, and also indicates values of parameters used in the processing.

The area management data includes: an area ID indicating an identifier of the area; the number of zones indicating the number of the zone data in the area data; the number of engines indicating the number of the mixer engines belonging to the area indicated by the area data; each engine data indicating an ID of each of the engines, the number of inputs and outputs of its waveform I/O 19, the number of inputs and outputs of its audio network I/O 21, its address on the control network, and so on; and others.

Figure 7:
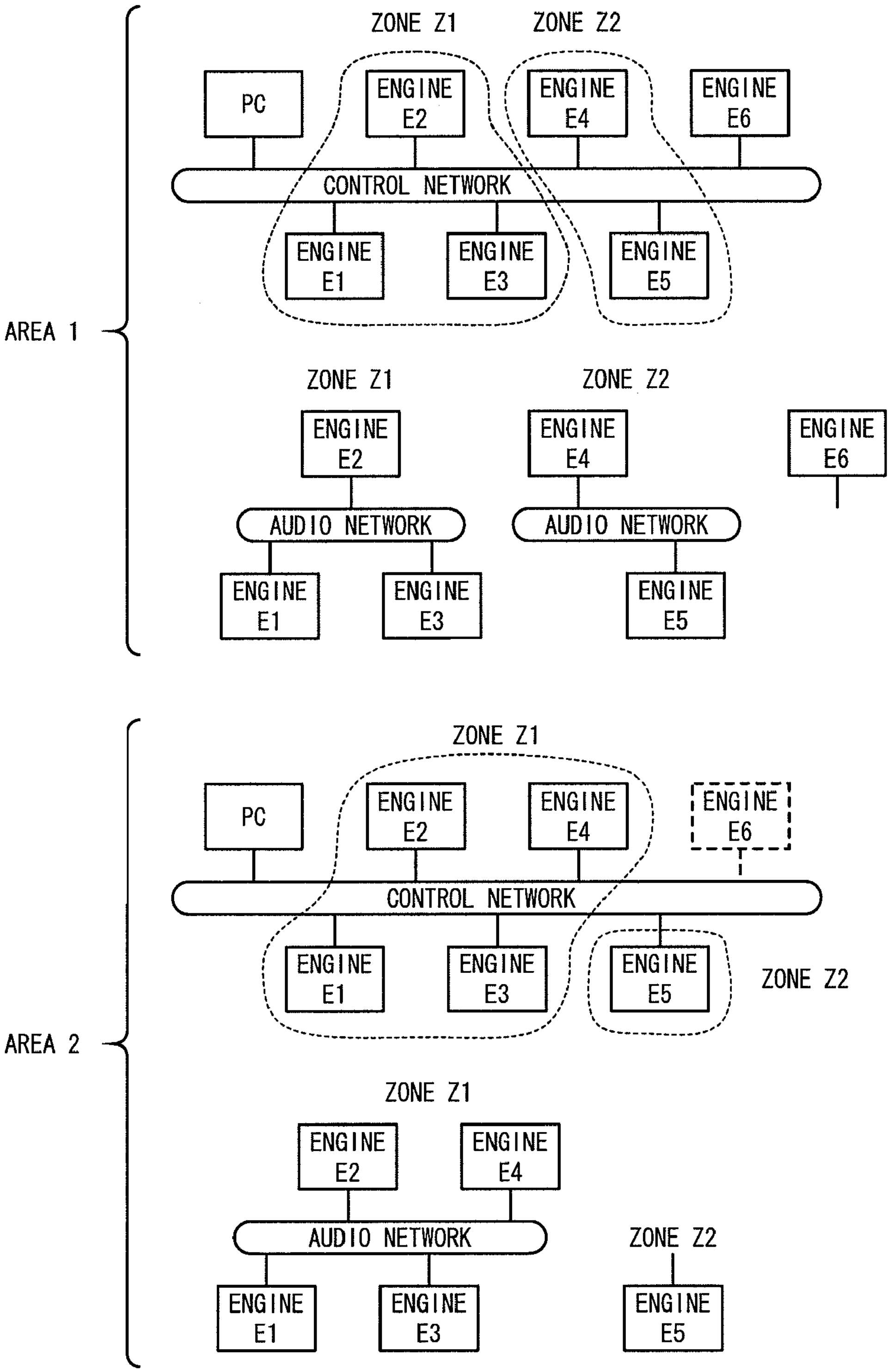
FIG. 7 is a diagram to describe “area” and “zone” in the mixer system shown in FIG. 2.

Here, the relation between the "area" and "zone" will be described, using FIG. 7. FIG. 7 is a diagram to describe "area" and "zone", taking a mixer system as an example where six mixer engines are connected to a PC via a control network as shown in FIG. 2.

First, as in an area 1 shown in FIG. 7, all the mixer engines connected to the PC via the control network are basically made to belong to an area when the system is to be operated. Then, the PC 30 controls only the mixer engines belonging to the selected area. Note that it is also possible to exclude from the "area" a part of the mixer engines such as an engine E6 shown by the broken line in an area 2. In this case, the mixer engine excluded from the area is no longer under the control of the PC 30 and operates independently.

Further, in the area, a group of the mixer engines (or a mixer engine) cooperatively operated in the audio signal processing is defined as a zone. When the PC 30 transmits data specifying a zone to each of the mixer engines, each of the mixer engines receiving the data causes, through the VLAN function of the switching hub 110, the audio network to function as if the audio network were an independent network allotted to each zone.

Here, the number of zones provided in one area may be any, and the number of the mixer engines belonging to one zone may also be any. Further, the zones can be set irrespective of the physical arrangement position, but one mixer engine never belongs to the plural zones in the same area. Conversely, there may be a mixer engine belonging to no zone, and this engine operates independently under the control of the PC 30. Further, the combination of the mixer engines belonging to each zone may be different between different areas.

The foregoing is the relation between "area" and "zone". The user selects an area to be applied to the mixer system. This user's selection is considered to mean that all the zones in this area should be applied to the mixer system. The processing concerning this respect will be described in detail later.

Returning to the description of FIG. 6, each zone data includes zone management data, one or more configuration data for PC or more, a scene data group, and other data.

The zone management data includes data such as a zone ID indicating an identifier of the "zone", the number of engines indicating the number of the mixer engines belonging to the "zone" indicated by the zone data, each engine ID (corresponding to specifying data) indicating an ID of each of the mixer engines, the number of configurations indicating the number of configuration data included in the zone data, the number of scenes indicating the number of scene data included in the scene data group in the zone data, and so on.

On the other hand, the configuration data, which is data indicating the configuration of signal processing that the user edits, is saved when the user selects save of the edit result in such a manner that the contents of the configuration of signal processing at that point in time are saved as one set of configuration data for PC. Each configuration data for PC includes: configuration management data; CAD data for PC being configuration data indicating the contents of a part of the edited configuration of signal processing, which is assigned to an individual mixer engine, for each mixer engine belonging to the zone; and one or more preset operation data each being a set of values of parameters for use when the mixer engine executes the audio signal processing indicated by the CAD data for PC.

Among them, the configuration management data includes data such as a configuration ID uniquely assigned to a configuration when it is newly saved, the number of engines indicating the number of the mixer engines that are to execute the audio signal processing according to the configuration data (typically, the number of the mixer engines belonging to a zone corresponding to the configuration), the number of operation data indicating the number of the preset operation data included in the configuration data, and so on.

Besides, the CAD data for PC corresponding to each mixer engine includes: CAD management data; component data on each component included in the part of the edited configuration of signal processing, which is to be executed by (assigned to) the target mixer engine; and wiring data indicating the wiring status between the components. Note that if a plurality of preset components of the same kind are included in the configuration of signal processing, discrete component data is prepared for each of them.

The CAD management data includes the number of components indicating the number of the component data in the CAD data.

Each component data includes: a component ID indicating what preset component that component corresponds to; a component version indicating what version of preset component that component corresponds to; a unique ID being an ID uniquely assigned to that component in the configuration of signal processing in which that component is included; property data including data on the number of input nodes and output nodes of the component, and the like; and display data for PC indicating the position where the corresponding component is arranged in the edit screen on the PC 30 side and so on.

Besides, the wiring data includes, for each wiring of a plurality of wirings included in the edited configuration of signal processing: connection data indicating what output node of what component is being wired to what input node of what component; and display data for PC indicating the shape and arrangement of that wiring in the edit screen on the PC 30 side.

The set of CAD data for PC as described above corresponds to the configuration data stored in the PC 30 side. Each CAD data for PC corresponding to each mixer engine corresponds to partial configuration data.

Each preset operation data in the aforesaid configuration data includes operation data indicating the values of the parameters that are used in the audio signal processing defined by the CAD data for PC when this processing is to be executed by each mixer engine. This operation data is provided for each mixer engine.

The operation data for each mixer engine includes component operation data each being the values of the parameters corresponding to each component in the processing to be executed by this mixer engine. The format and arrangement of data in each component operation data are defined: by the data composition data in the preset component data for PC corresponding to the preset component that is specified by the component ID and component version of this component which are included in the CAD data for PC; and by the property data of this component included in the CAD data for PC.

When new configuration data is saved, it is preferable to initialize the preset operation data, automatically read the preset operation data of other existing configuration data, or automatically save the contents of the current scene at that point in time as the preset operation data.

The set of the preset operation data as described above corresponds to operation data stored in the PC 30 side. Each operation data corresponding to each mixer engine corresponds to partial operation data.

Further, the scene data group in the zone data includes one or more scene data, and each scene data includes a configuration number specifying the configuration data (corresponding to first specifying data) and an operation data number specifying the preset operation data in the configuration data (corresponding to second specifying data). Incidentally, since the CAD data is uniquely specified by the determination of the configuration number, the configuration number can be considered as data specifying the CAD data.

Then, when the user designates one piece of the scene data for each zone, it is possible to cause each mixer engine belonging to this zone to execute the audio signal processing indicated by the configuration data specified by the configuration number included in the designated scene data. In addition, the values of the parameters indicated by the operation data, which is included in this configuration data, indicated by the operation data number included in the designated scene data can be used by each mixer engine as the values of the parameters of the audio signal processing. Such combination of the contents of the audio signal processing and the values of the parameters concerning the processing is called a scene.

As for such scene data, the user designates the scene number to and instructs the PC to save (store) the current scene (set state), whereby the configuration number indicating the configuration data effective at this point in time and the operation data number indicating the preset operation data, which is included in this configuration data, corresponding to the current scene at the time of the save are saved as a scene corresponding to the designated scene number included in the scene data group. At this time, if any of the preset operation data in this configuration data does not match the preset operation data corresponding to the current scene, this current scene is saved as new preset operation data prior to the aforesaid save of the scene.

The other data in the zone data includes data on wiring among the mixer engines in the audio network, which is set in the edit screen shown in FIG 4.

The above data are primary data stored in the PC 30 side, and these data may be stored in a non-volatile memory such as a HDD (hard disk drive) in advance to be read out into the RAM for use when necessary.

In addition to the above data, the PC 30 also stores current scene indicating values of parameters that are currently effective in the currently effective configuration as shown in FIG. 5B. Here, in this mixer system, since it is possible to operate the mixer engines independently zone by zone, the current scene is also prepared for each zone. The current scene for each zone has the same composition as that of the aforesaid preset operation data. That is, the data is in the form in which the operation data for the respective mixer engines belonging to the zone and for the respective components are combined. When the values of the parameters concerning one component in the configuration of signal processing are edited on the control panel or the like, the values of the parameters concerning this component in the current scene are changed. Then, the result thereof can be saved as one set of the preset operation data.

Further, as shown in FIG. 5C, the PC 30 also includes a buffer where CAD data for transfer to engine in a format appropriate for the processing in the mixer engine 10 is created from the CAD data for PC when the configuration data is transferred to the mixer engine 10 in the aforesaid “Compile” processing. The CAD data for transfer to engine that is to be transferred to each mixer engine is created in such a manner that portions concerning a transfer destination engine are extracted from the CAD data for PC, data not used by the mixer engine 10 side such as the aforesaid display data for PC on the components and wiring are deleted, and portions not used between data are closed up for packing.

Further, as shown in FIG. 5D, the PC 30 also stores engine information in which engine IDs and IP addresses of the mixer engines connected to the PC 30 are associated with each other. The PC 30 executes the control program to automatically collect data such as IDs and IP addresses of devices (including the mixer engines 10) connected to the control network at a predetermined cycle, and based on the result thereof, the engine IDs and the IP addresses stored as the engine information are also updated. That is, the engine IDs and the IP addresses can be considered as the latest data in the control network. By referring to this data when an “area” or a “zone” is selected, it is possible to judge whether or not necessary mixer engines are connected.

Figure 8A:
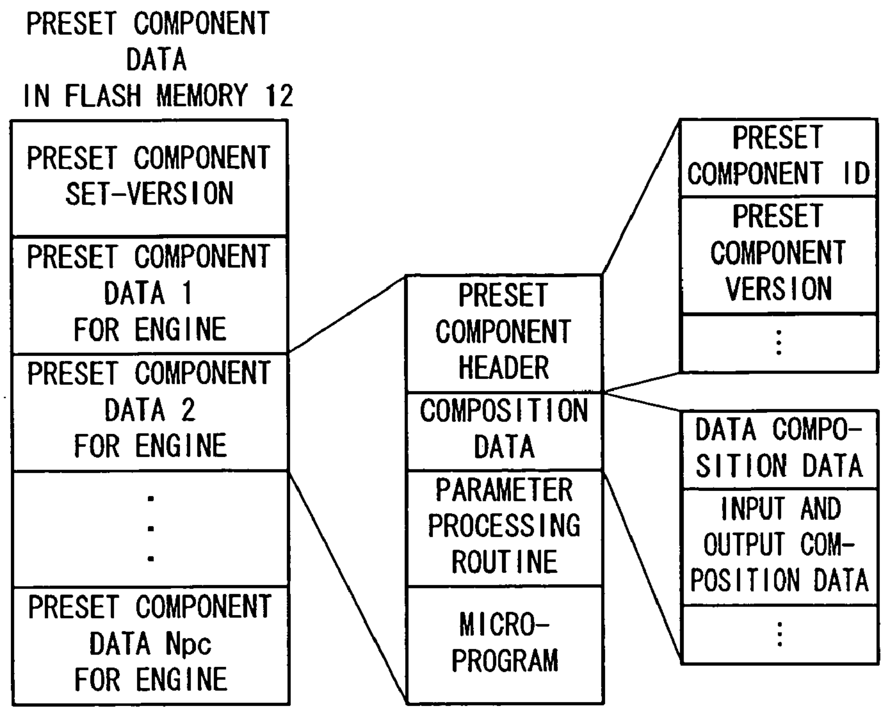
FIG. 8A to FIG. 8C are diagrams showing part of a composition of data stored in the mixer engine side, out of the data involved in the invention.
Figure 8B:
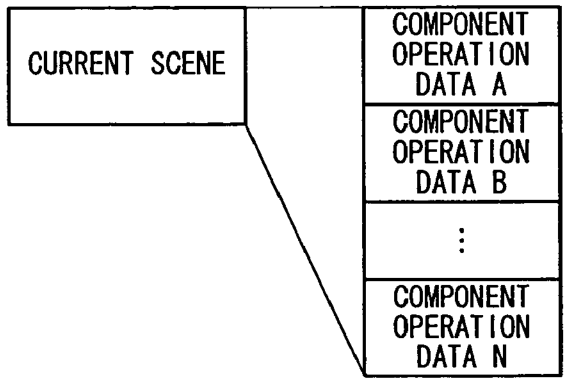
Figure 8C:
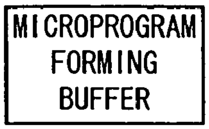
Figure 9:
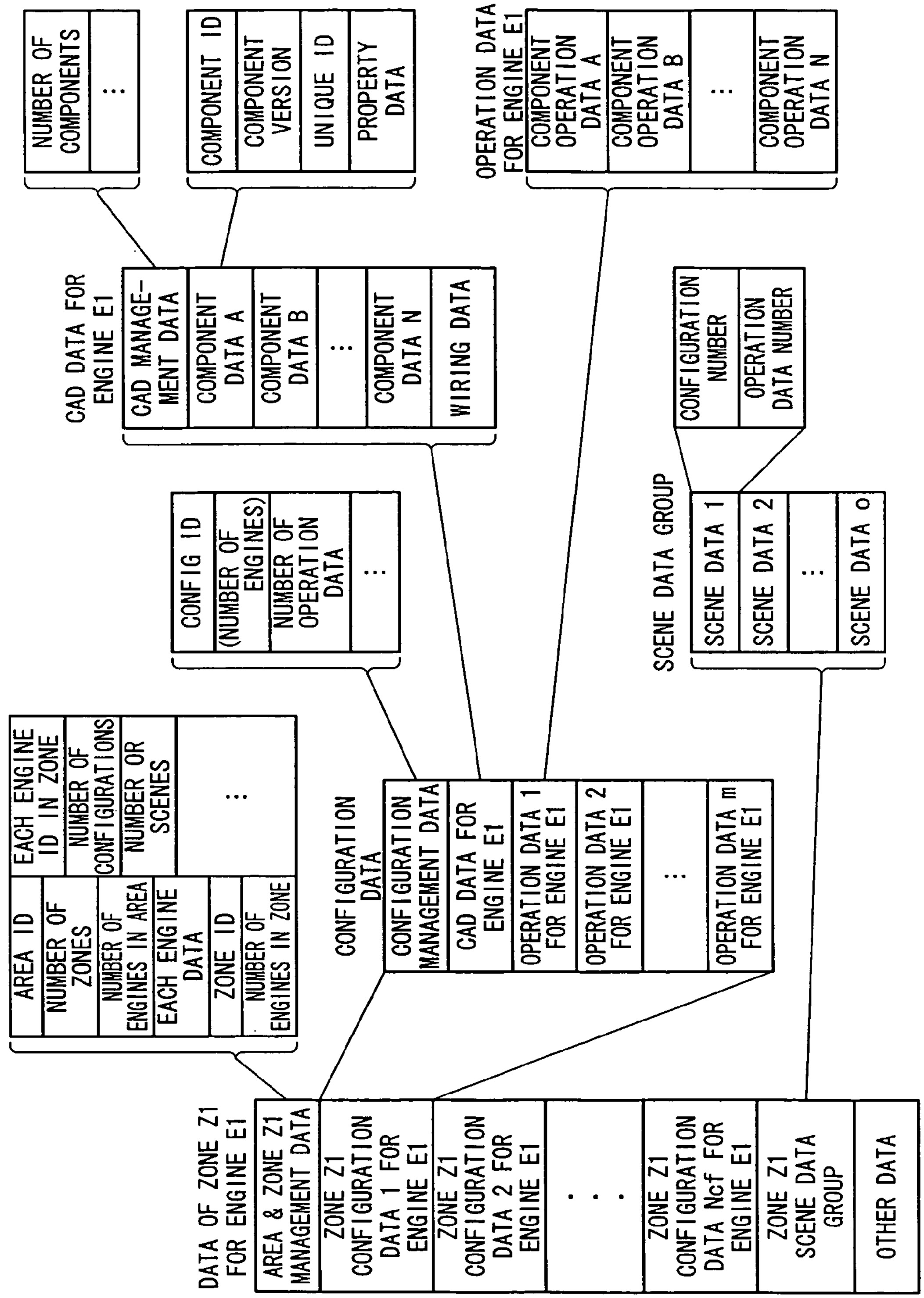
FIG. 9 is a diagram showing another part of the same.

Next, FIG. 8A to FIG. 9 show the compositions of data stored in the mixer engine 10 side. Here, data to be stored in the engine E1 shown in FIG. 2 and FIG. 7 are shown as a typical example, but the data in the other mixer engines are composed in the same manner.

As shown in these drawings, the engine E1 stores, as primary data, preset component data and zone data on a zone to which the engine E1 belongs (here, a zone Z1). Note that the preset component data is stored in the flash memory 12 and the composition contents thereof are slightly different from those in the PC 30 side. The zone data, which is stored in the RAM 13, is data on a part to be assigned to the engine E1, in the audio signal processing to be executed in the zone Z1 to which the engine E1 belongs, and it is data resulting from the processing of the zone data in the PC 30 side. Here, these data will be described, focusing on what are different from the data stored in the PC 30 side.

As shown in FIG. 8A, the preset component data stored in the engine E1 includes preset component data for engine. This preset component data for engine is data for causing the engine E1 to execute the audio signal processing of each component, and is different from the preset component data for PC in that a microprogram for causing the DSP 20 to operate and function as this component replaces part of the display and edit processing routine.

Further, since the configuration of signal processing is not edited and the characteristic graph of the operation parameters are not displayed on the mixer engine 10 side, the preset component data for engine includes neither the display data for PC nor part of the routines included in the display and edit processing routine for PC, such as the routine for displaying a characteristic graph which are included in the composition data for PC. Note that on the mixer engine 10 side, the values of the parameters can be displayed on the display 14 to allow the user to edit them with the controls 15. For this purpose, the routine for converting the values of the operation parameters to text data for display, which is included in the display and edit processing routine for PC, is required, and this routine is included in a parameter processing routine.

The preset component data for engine is the same as the preset component data in the PC 30 side except for the above-described respects. The same IDs and versions as those of the corresponding sets and components on the PC 30 side are used, so that the correspondence thereof can be recognized.

Next, as for the zone data, it includes area and zone management data, one or more configuration data, and a scene data group as shown in FIG. 9. Since in this mixer system, one mixer engine never belongs to the plural zones concurrently, the engine E1 stores only one piece of zone data.

The area and zone management data is data on the zone indicated by the zone data and on an area to which this zone belongs, and it is the combination of the data included in the area management data and zone management data which are stored in the PC 30 side. Specifically, the area and zone management data includes data such as: an area ID, the number of zones, the number of engines, and each engine data which are included in the area management data on the PC side; and a zone ID, the number of engines in the zone, IDs of the engines in the zone, the number of configurations, the number of scenes, and so on which are included in the zone data on the PC side.

As for the configuration data, each includes configuration management data, CAD data for engine E1, and one or more operation data for engine E1. The configuration management data is the same as that in the configuration data for PC (the data on the number of engines is not necessary and may be deleted), but the engine E1 CAD data is composed in such a manner that the display data for PC is deleted from the engine E1 CAD data for PC shown in FIG. 6 and the resultant is subjected to packing as described above. The operation data for engine E1 is generated by extracting only the operation data for engine E1 from the preset operation data stored in the PC 30 side.

The configuration data for engine is the same as the configuration data on the PC 30 side except for the above-described respects, and the same IDs and versions as those in the corresponding configurations and components on the PC 30 side are used, so that the correspondence thereof can be recognized.

As for the scene data group, it also includes completely the same data as those in the corresponding scene data group on the PC 30 side. The reason is that the scene data group here includes the configuration number and the operation data number corresponding to each scene data, and these data are common to the engines in the zone.

As shown in FIG. 8B, the engine E1 also stores a current scene which is setting data to be reflected in the signal processing to be executed by the DSP 20. Data in the current scene has the same composition as that of the operation data for engine E1 described above. However, it stores only the current scene concerning the zone to which the engine E1 currently belongs since the engine E1 never belongs to the plural zones concurrently.

Further, the mixer engine 10 is for processing audio signals based on the configuration of signal processing edited on the PC 30. Accordingly, the CPU 11 forms the microprogram which the DSP 20 executes, based on the CAD data for engine received from the PC 30, and thus has a microprogram forming buffer prepared as a work area for the formation, as shown in FIG. 8C.

In microprogram forming processing, the microprogram is sequentially read out from the preset component data specified by the component ID which is included in the CAD data for engine, assignment of resources such as an input/output register, a delay memory, a store register, and so on which are required for operation of each component is performed; and the microprogram is processed based on the assigned resources and then written into the microprogram forming buffer.

In this event, based on the wiring data included in the CAD data for engine, a program for passing data between the input/output registers corresponding to the input and output nodes of each component is further written into the microprogram forming buffer.

The reason why the microprogram is processed based on the resource assignment here is to correspond it to the architecture of the DSP 20 included in the mixer engine 10. Therefore, for another architecture, a parameter corresponding to the assigned resource, for example, may need to be set in the DSP 20 in place of processing the microprogram itself.

3. Processing for Setting the Configuration of Signal Processing in the First Embodiment: FIG. 10 to FIG. 14

Next, processing when the user sets the configuration of signal processing to be executed in this mixer system will be described. First, area selection processing will be described.

Figure 10:
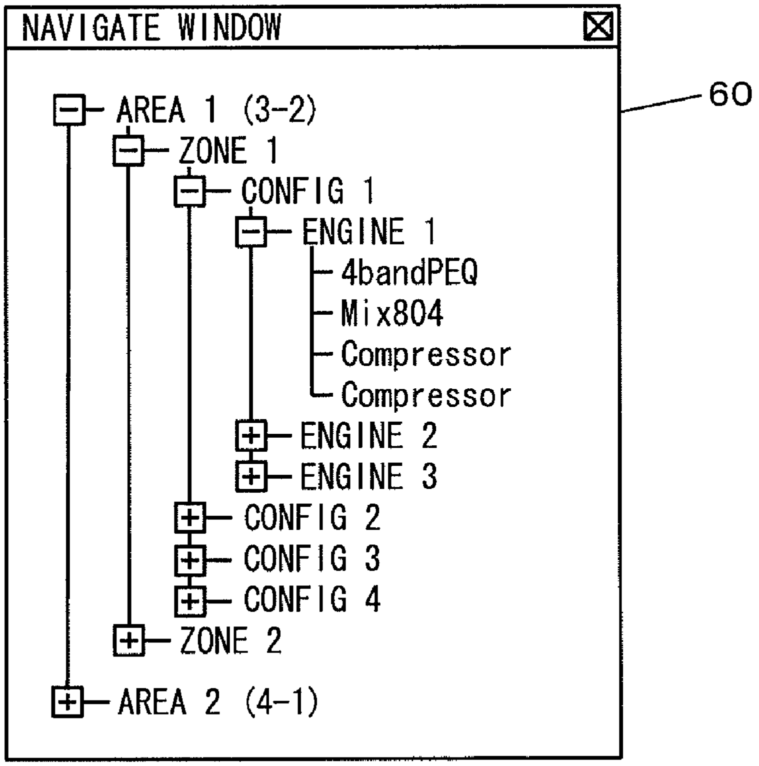
FIG. 10 is a view showing an example of a navigate window displayed on the display of the PC shown in FIG. 2.

In this mixer system, when the user edits the configuration of signal processing on the PC 30, a navigate window 60 shown in FIG. 10 as well as the edit screens shown in FIG. 3 and FIG. 4 is displayed on the display of the PC 30.

In this navigate window 60, the contents of the data stored in the PC 30 in the manner shown in FIG. 6 are divided into hierarchies such as the aforesaid area, zone, configuration, and engine, and are thus displayed in a tree structure. The contents of items whose details are not displayed in the example shown in FIG. 10, for example, the contents of the zone 2 and the like, can be also displayed by giving an instruction for detailed display of these parts. Note that "(3-2)" on the right of the "area 1" indicates that the area 1 has a zone constituted of three mixer engines and a zone constituted of two mixer engines. Similarly, "(4-1)" on the right of the "area 2" indicates that the area 2 has zones constituted of four mixer engines and of one mixer engine.

When the user selects a configuration in the navigate window 60, the PC 30 displays on its display the CAD screen as shown in FIG. 4 for the edit of, for example, the connection among the mixer engines in the zone in this configuration and accepts the edit of the configuration. At this time, if the mixer engines belonging to the zone have been determined, the CAD screen displays only the mixer components representing the mixer engines belonging to this zone, and the addition and deletion thereto/therefrom are not allowed.

Upon user's selection of an engine, the PC 30 displays on its display the CAD screen as shown in FIG. 3 for the edit of the contents of part of the signal processing according to the configuration, which is to be assigned to this engine, and it accepts the edit of the configuration of signal processing to be executed by the selected engine. Since specifying the kind and option equipment on each mixer engine in the zone clarifies the number of inputs/outputs and a throughput capacity of the DSP 20 in each mixer engine, the configuration of signal processing of each mixer engine is edited so as not to exceed the range of its capacity. If the capacity range is exceeded, an alarm is preferably given.

Though a CAD screen for the edit of the configuration of an area or a zone is not shown in the drawing, the PC 30 displays on its display a CAD screen for the edit thereof when the user selects an area or a zone in the navigate window 60. Then, in this screen, it is possible to set the kind, options, and the like of the mixer engines belonging to the area and to set the mixer engines that are to constitute each zone in the area. Incidentally, the mixer engines do not necessarily have to be actually connected when the data is edited.

Figure 11:
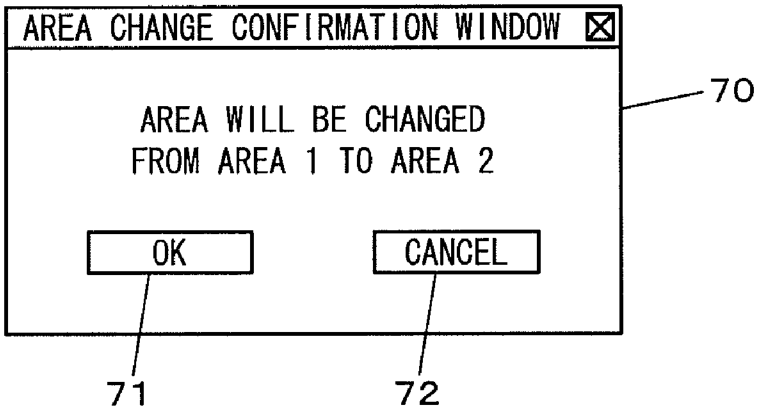
FIG. 11 is a view showing an example of an area change confirmation window displayed on the aforesaid display.

When the user selects an area in the navigate window 60 described above to instruct a change to this area, the PC 30 performs processing associated with the area change. However, this processing includes transferring zone data on the new area to the mixer engines in the mixer system and other processing, which require a certain length of time. Therefore, an area change confirmation window 70 as shown in FIG. 11 is displayed on the display prior to the execution of the processing, thereby confirming whether the user permits the change or not. Then, if the user presses down a cancel key 72, the area change is not started and the original CAD screen is displayed again, and only when the user presses down an OK key 71, the processing associated with the area change is started.

Preferably, the edit of the configuration of signal processing is executable irrespective of the currently selected area.

Figure 12:
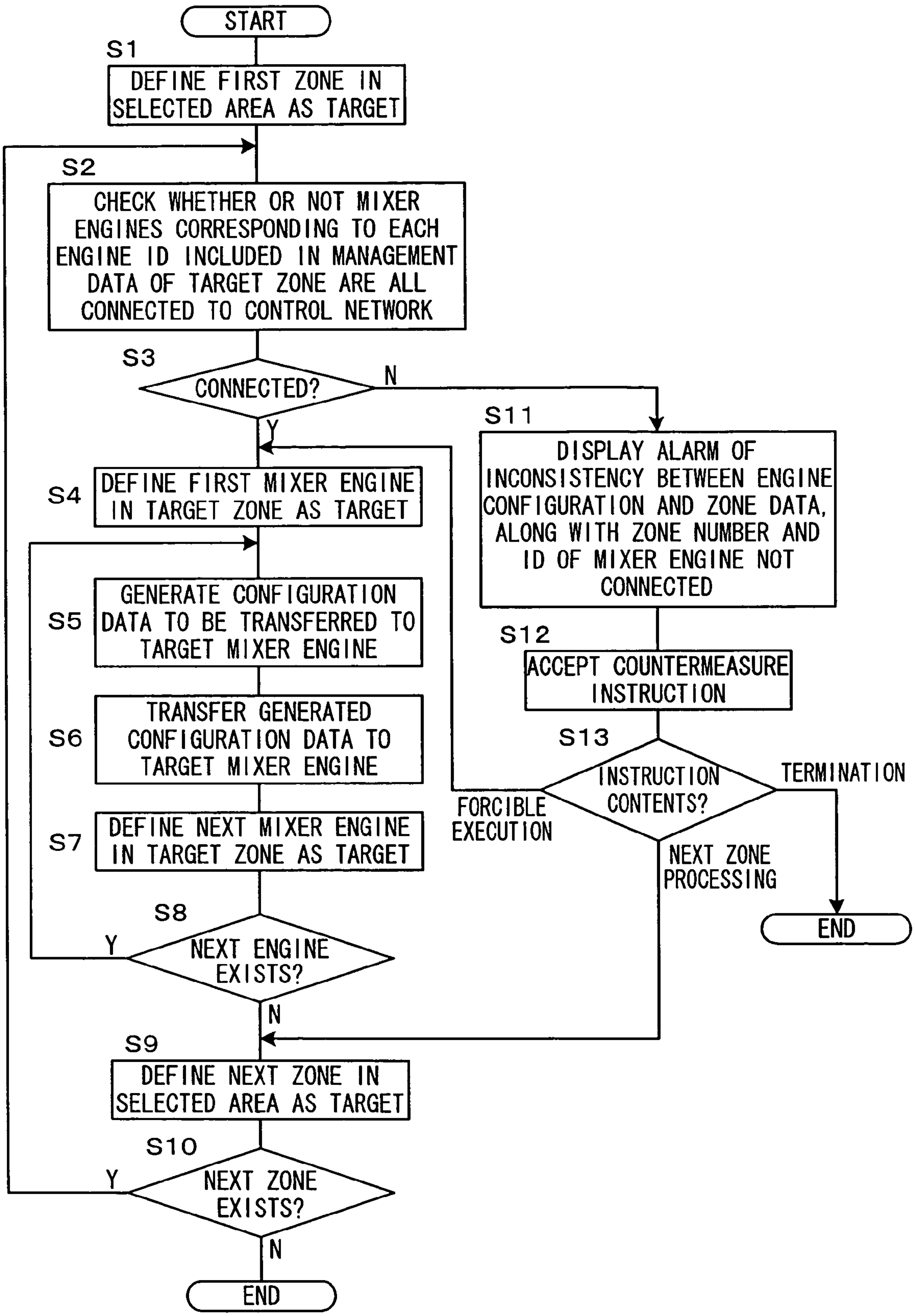
FIG. 12 is a flowchart showing processing associated with area change, which is executed by a CPU of the PC shown in FIG. 2.

The above-described processing associated with the area change is shown in the flowchart in FIG. 12.

In this processing, first at Step S1, the first zone in the selected area is defined as a target, and at Step S2, it is checked whether or not all the mixer engines to be used in the target zone are connected to the control network, that is, whether or not they are controllable from the PC 30 based on the selected zone data. To check this, the engine IDs included in the zone management data of the target zone and the engine IDs in the engine information stored in the PC 30 are compared. In this processing, the CPU of the PC 30 functions as a checking device.

Then, if the result shows "connected", that is "controllable", at Step 3, then from Steps S4 through S8, the configuration data to be stored in the respective mixer engines in the target zone are generated and transferred to these mixer engines in sequence. Note that generation processing (S5) performed here is processing in which the CAD data indicating a part of the configuration of signal processing to be assigned to the target mixer engine and the operation data indicating the values of the parameters to be used in this configuration of signal processing are extracted from each configuration data shown in FIG. 6 included in the PC 30 side zone data of the target zone, and the format of the CAD data is further converted into the format for engine, so that the configuration data for transfer to the target engine shown in FIG. 9 is generated. Transfer processing (S6) is processing for transferring the generated configuration data to the target mixer engine via the control network to have the configuration data stored in the target mixer engine. The mixer engine stores this configuration data as the configuration data for engine upon receipt thereof. In this processing, the CPU of the PC 30 functions as a transferring device.

When the above processing is finished for all the mixer engines in the target zone, the flow goes to Steps S9 and S10. If there remains in the selected area a zone yet to be defined as a target, the flow returns to Step 2 and the processing is repeated. If all the zones have already been defined as targets, the processing is finished.

If at Step S3, at least one mixer engine to be used in the target zone is found not connected, an alarm message to that effect is displayed on the display and a countermeasure instruction is accepted at Steps S11 and S12. As the contents of the instruction accepted at Step S12, choices are provided here, namely, "forcible execution" for transferring the necessary configuration data only to the connected mixer engines, "next zone processing" for terminating the processing for the target zone to shift to the processing for the next zone, and "termination" for terminating the processing itself associated with the area change.

Then, at Step 13, the contents of the instruction are discriminated, and if "forcible execution" is selected, the flow goes to Step S4 and the processing is continued. If "next zone processing" is selected, the flow goes to Step S9 and the processing is continued, and if "termination" is selected, the processing is terminated.

In the case of "forcible execution", the processing from Steps S4 through S8 targeted only at the mixer engines connected to the control network, out of the mixer engines in the target zone, is repeated. The execution of such processing only allows the execution of a part of the registered configuration of signal processing in the target zone and thus, the desired audio signal processing cannot be generally executed. However, in order to respond to a demand for the partial execution, which arises in some cases, this mixer system has the function of "forcible execution". Therefore, this function is not an indispensable one.

By the execution of the above-described processing, for all the zones in the area the change to which has been instructed, it is possible to have each mixer engine store the necessary zone data so that one mixer engine or more in the zone can cooperatively perform the audio signal processing. Thereafter, it is possible to get each zone ready for the execution of the audio signal processing following the desired configuration of signal processing and parameter values, only by selecting, for each zone, the configuration number and the operation data number to be used.

Then, the user designates a scene for each zone, in other words, selects the scene data to be applied to the audio signal processing in the zone from the scene data group in the zone data, so that the audio signal processing can be executed. This selection is equivalent to the selection of the configuration number and the operation data number included in the selected scene data. It is also considered that the specific operation data is selected and accordingly, the corresponding configuration number is selected.

Figure 13:
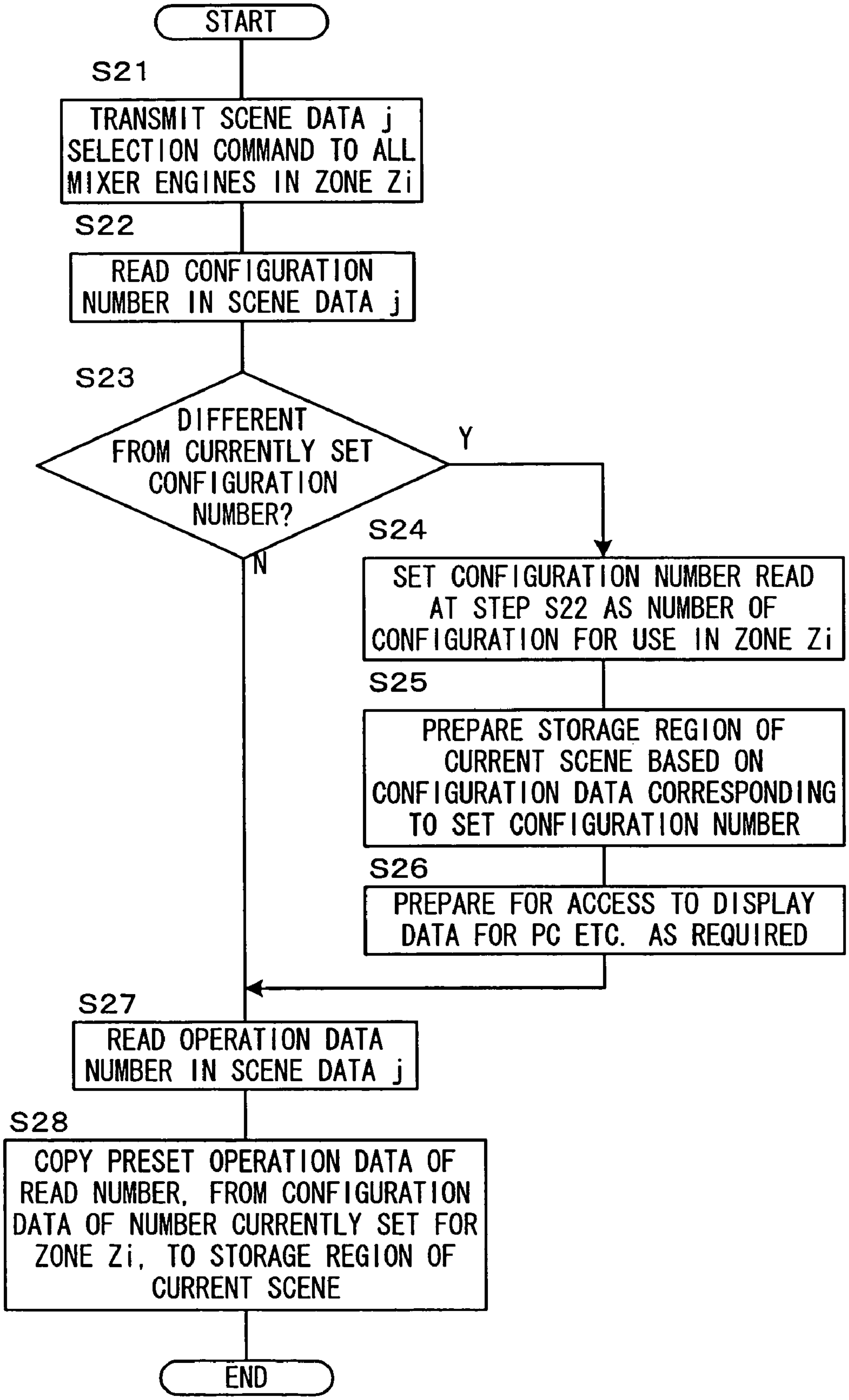
FIG. 13 is a flowchart showing processing executed by the aforesaid CPU of the PC when a scene data “j” is selected in a zone “Zi”

Then, the CPU of the PC 30 executes the processing shown in the flowchart in FIG. 13. FIG. 13 is a flowchart showing the processing when a scene data j is selected in a zone Zi.

In this processing, the CPU of the PC 30 first transmits a scene data j selection command to all the mixer engines in the zone Zi at Step S21. This command is a command for designating the scene data j to cause the mixer engines as transmission destinations to perform the signal processing according to this scene data. In order to determine which mixer engines should be the transmission destinations, the data on each engine ID in the zone Zi management data is referred to.

Thereafter, at Step S22, the configuration number in the selected scene data j is read out from the scene data group in the zone data of the zone Zi. Then, if the read configuration number is different from the configuration number currently set for the zone Zi, the flow goes from Step S23 to Steps S24 and S25, where the use of the configuration corresponding to the read configuration number is set and a storage region of the current scene is prepared based on the configuration data corresponding to the read configuration number. Specifically, based on each CAD data in the configuration data, the preset component data of each component included in the configuration of signal processing is referred to, the data format of the parameters is found from the data composition data included therein, and the region required for the storage is prepared. Further, if operations such as displaying the configuration of signal processing according to the set configuration data on the display are required, preparations for an access to the display data for PC and the like are made as required at Step S26, and the flow goes to Step S27. If there is no difference in the configuration number, the flow goes from Step S23 directly to Step S27.

Then, at subsequent Steps S27 and S28, the operation data number in the scene data j is read out, the preset operation data of the read number is copied from the configuration data of the number currently set for the zone Zi to the storage region of the current scene, and the processing is finished.

Figure 14:
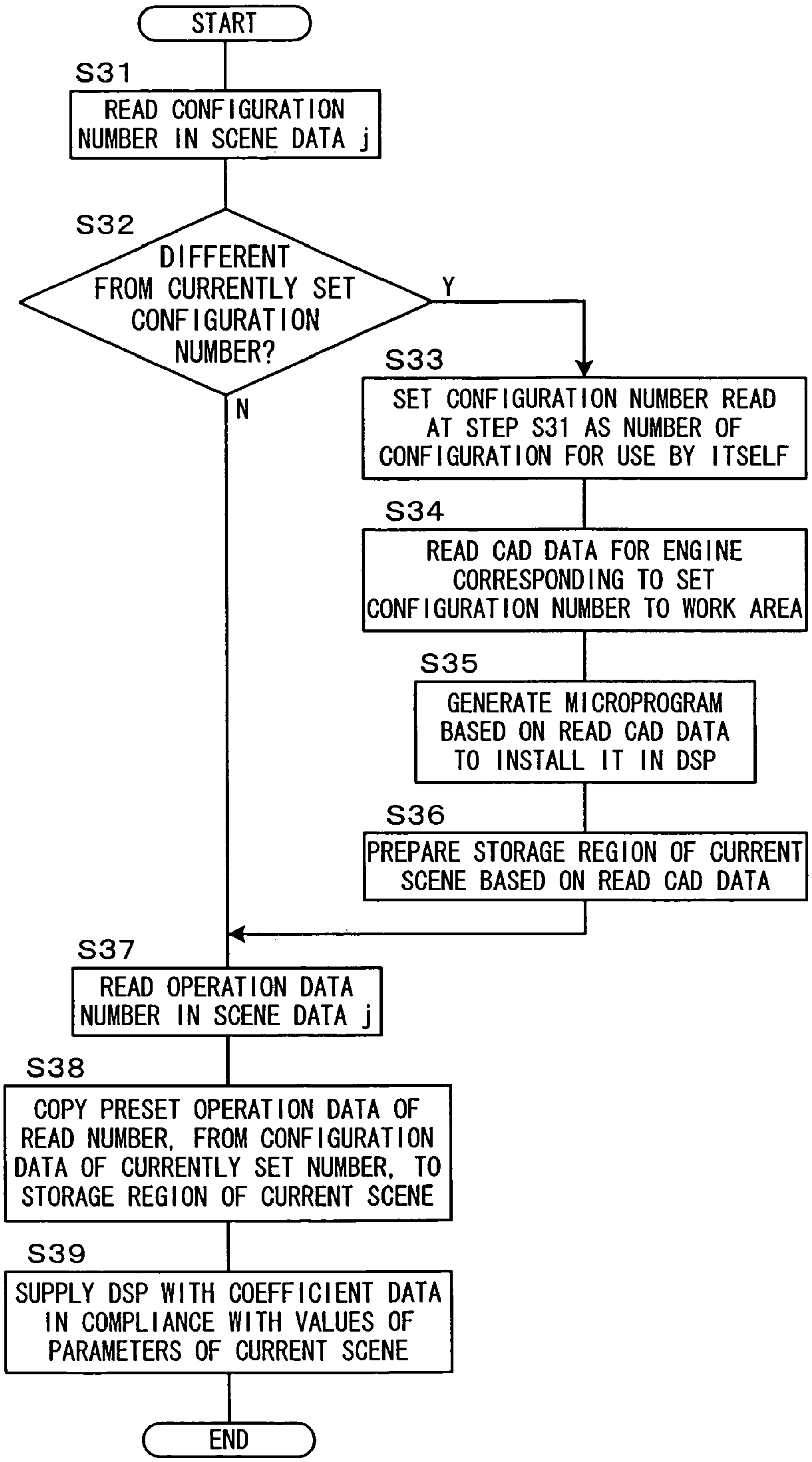
FIG. 14 is a flowchart showing processing executed by a mixer engine shown in FIG. 2 when it receives a scene data j selection command.

Meanwhile, when receiving the aforesaid scene data j selection command, in other words, when being instructed to execute the audio signal processing based on the scene data j, the CPU 11 of the mixer engine 10 starts the processing shown in the flowchart in FIG. 14.

In this processing, first at Step S31, the CPU 11 reads out the configuration number in the scene data j indicated by the selection command, from the scene data group in the zone data stored in the mixer engine 10. Then, if the read configuration number is different from the configuration number currently set, the flow goes from Step S32 to Steps S33 through S36, where the use of the configuration corresponding to the read configuration number is set, and the CAD data for engine included in the configuration data corresponding to the read number is read out to the work area. Then, based on the read CAD data, the microprogram for use in the execution of the audio signal processing according to the configuration corresponding to the set number is generated from the microprogram in the preset component data for engine, and the generated microprogram is installed in the DSP 20. Further, based on the read CAD data, a storage region for the current scene is prepared as is done in Step S25 in FIG. 13. What is prepared here, however, is only a region for storing the values of the parameters involved in a part of the signal processing that the mixer engine 10 itself is to execute. If there is no difference in the configuration number, the flow goes from Step S32 directly to Step S37.

Then, at subsequent Steps S37 through S39, the operation data number in the scene data j is read out, the preset operation data of the read number is copied from the configuration data of the currently set number to the storage region of the current scene, coefficient data in compliance with the values of the parameters indicated by this operation data is supplied to the DSP 20 for use in the audio signal processing, and the processing is finished.

Through the above-described processing shown in FIG. 13 and FIG. 14, the PC 30 side is capable of causing the mixer engines 10 to execute the signal processing according to the selected configuration, using the values of the parameters indicated by the selected operation data. In addition, the configuration data and the operation data consistent with those on the mixer engine 10 side are stored as the currently effective data, so that the PC 30 side can be ready to quickly respond to the edit of the configuration of signal processing and the edit of the parameters.

The mixer engine 10 side follows the instruction from the PC 30 side so that it is capable of executing the part of the signal processing assigned to itself, out of the signal processing according to the designated configuration, using the values of the parameters indicated by the designated operation data.

In the mixer system described above, any number of zones can be set in an area, which enables cooperative operation of any combination of the plural mixer engines connected to the PC 30. Moreover, the physical change of wiring is not required at this time.

Further, when the area is selected, the data necessary for the signal processing is transferred to the mixer engines after it is confirmed that all the necessary mixer engines in each zone in the selected area are connected. This eliminates a need for confirming the existence of the mixer engines at every change of the configuration of signal processing after the area is once selected, and makes it possible to easily change, for each zone, the contents of the configuration of signal processing and the values of the parameters, only by the selection of the configuration and the operation data. Moreover, only the transmission of a simple command to the mixer engines 10 from the PC 30 is required in this event, which enables quick responsiveness in changing the configuration of signal processing.

Further, the configuration and operation data to be used can be selected at a time by the selection of the scene data. This results in good operability in changing the configuration of signal processing and enables the mixer engine 10 to start the audio signal processing, using desired parameter values concurrently with the change of the configuration of signal processing. This can also realize quicker responsiveness in changing the configuration of signal processing.

Figure 15:
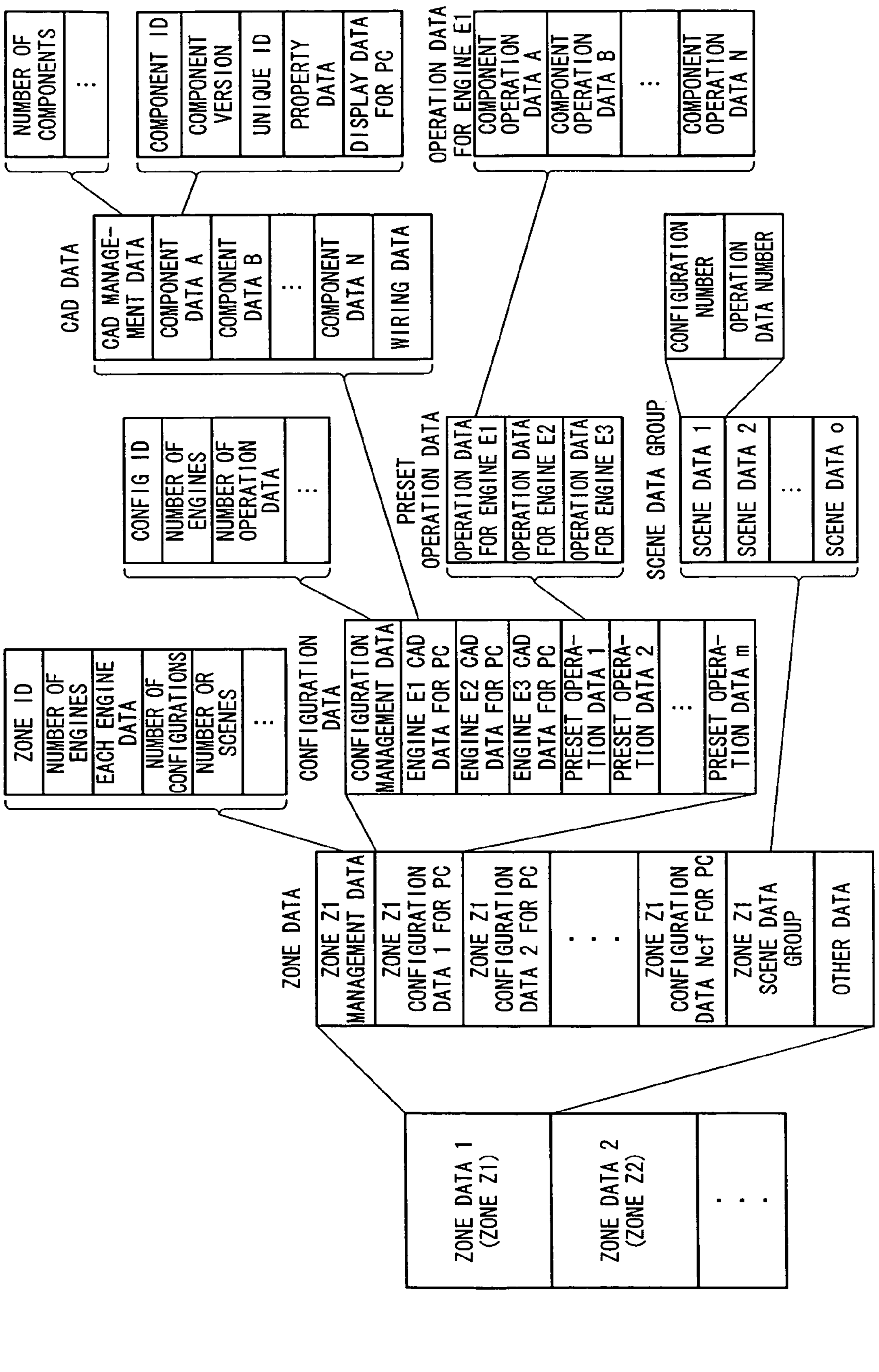
FIG. 15 is a diagram, which corresponds to FIG. 6, showing part of a composition of data stored in a PC side, out of data involved in the invention, in a second embodiment of the audio signal processing system of the invention.
Figure 16:
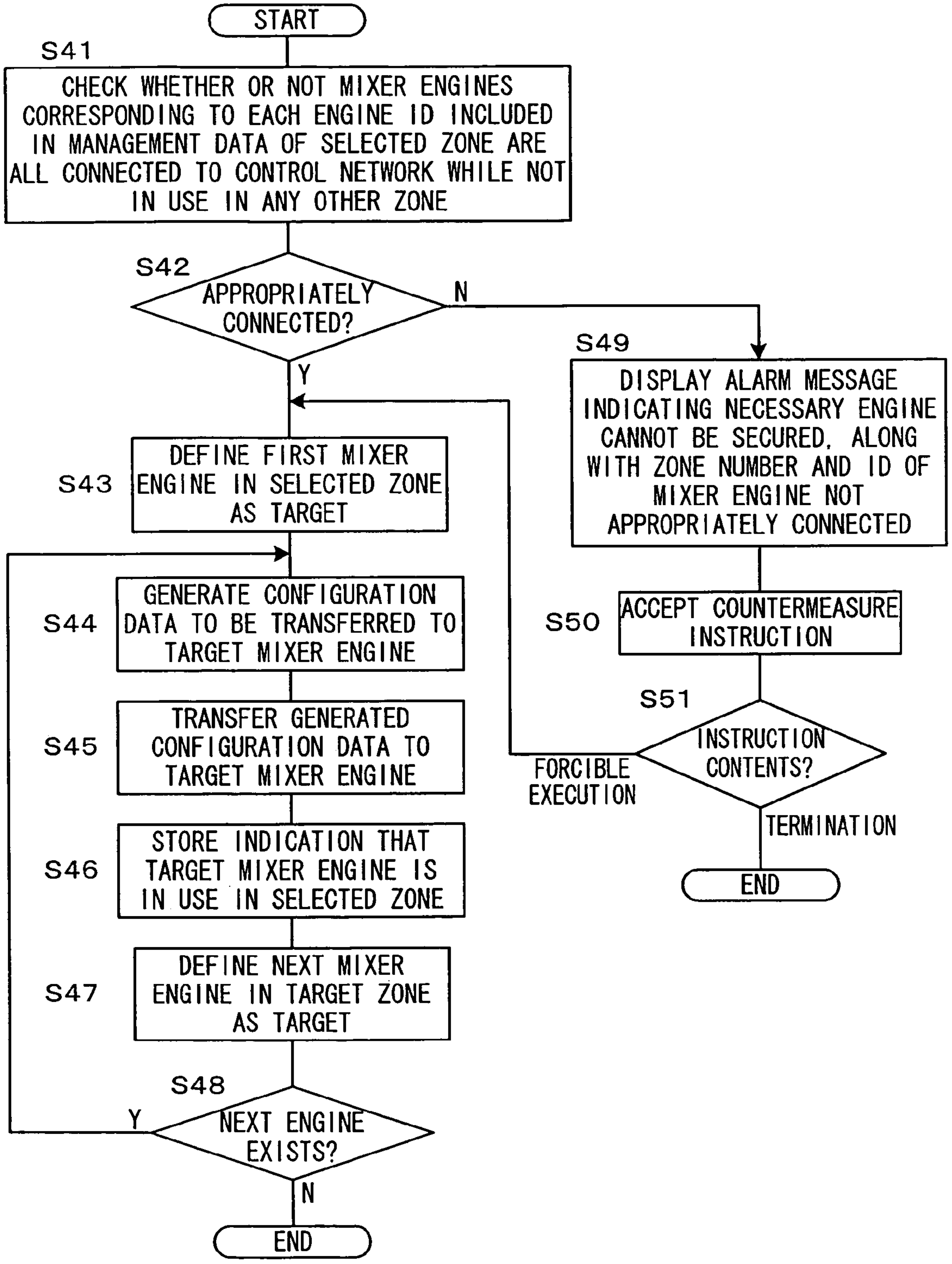
FIG. 16 is a flowchart showing processing associated with zone setting, which is executed by a CPU of the PC in the second embodiment.

4. Second Embodiment: FIG. 15 and FIG. 16

Next, a mixer system and a mixer engine as a second embodiment of the audio signal processing system and the audio signal processing device of the invention will be described.

This embodiment is different from the first embodiment in that it doesn't have the concept of "area". This respect will be described first.

In the mixer system, for constituting one zone, a user is free to designate mixer engines that are to cooperatively execute audio signal processing, without being restricted by the range of an area. This designation is made independently for each zone. This allows the definition of zones, for example, as shown in Table 1.

Specifically, in this embodiment, a zone can be defined irrespective of whether the mixer engines belonging to one zone belong to any other zone, so that such definition is possible that one mixer engine belongs to a plurality of zones. Moreover, at a stage of editing zone data, the mixer engines in the zone can be defined irrespective of the number, kind, and the like of the mixer engines actually connected to the PC 30.

When each mixer engine is to execute the audio signal processing, zones to be set in the mixer system are selected one by one, and the mixer engines belonging to each set zone are secured as being used in this zone. In this case, however, the mixer engine already secured as being used in one zone cannot be used concurrently in any other zone.

The mixer system of this embodiment is different from the mixer system of the first embodiment in this respect, but hardware configurations of devices are the same as those of the first embodiment. On the other hand, the composition of data stored in each device and processing executed by each device are slightly different from those of the first embodiment. The following describes these differences.

First, out of the composition of data involved in the invention, a part, which corresponds to FIG. 6, stored in the PC 30 side will be shown in FIG. 15.

This embodiment does not adopt the concept of "area", and thus neither area data nor area management data exists as shown in this drawing. Instead, zone data is data on the highest hierarchy. Further, as for the zone data, zone management data also includes each engine data included in the area management data in FIG. 6. This data includes data such as IDs, the number of inputs and outputs, addresses, and so on of the respective mixer engines belonging to the zone.

The composition of the zone data is the same as that of the first embodiment except for this respect.

As for data used on the mixer engine 10 side, its basic data format is the same as that described using FIG. 8A to FIG. 9 in the first embodiment since this embodiment is the same as the first embodiment in that the same mixer engine never belongs to two zones concurrently. However, since the concept of "area" is not adopted, this embodiment is different in that a part corresponding to the area and zone management data shown in FIG. 9 is replaced by the zone management data and thus the data on the area is not included.

Next, the processing associated with zone setting executed by a CPU of the PC 30 will be shown in FIG. 16.

In the mixer system of this embodiment, when a user selects a zone in the navigate window (no display regarding "area" is performed) as shown in FIG. 10 and instructs the setting of the zone, the CPU of the PC 30 starts executing the processing shown in the flowchart in FIG. 16. At this time, the user's permission for the execution of the processing may be confirmed as in the first embodiment.

In the processing in FIG. 16, it is checked at Step S41 whether or not all the mixer engines belonging to the selected zone are connected to a control network while they are not in use in any other zone, in other words, whether or not they are controllable as the mixer engines in the selected zone based on selected zone data. For this check, each engine ID regarding the selected zone, data on mixer engines in use in any other set zone, and engine IDs in the engine information stored in the PC 30 are compared. Since the concurrent use of the same mixer engine in the plural zones is not permitted, the mixer engine already in use in any other zone is judged as being uncontrollable based on the selected zone data. In this processing, the CPU of the PC 30 functions as a checking device.

Then, if it is judged (confirmed) at Step S42 that all the mixer engines are appropriately connected, that is, they are controllable, then from Step S43 through Step S48, the mixer engines in the selected zone are defined as targets in sequence, and as in the processing from Step S4 through Step S8 in FIG. 12, configuration data to be stored in each mixer engine is generated and transferred. Note that the processing at Step S46 is processing unique to this embodiment, and in this processing, data indicating that the target mixer engine is in use in the selected zone is stored. At this time, this data may be stored also in the target mixer engine itself.

On the other hand, if the judgment at Step S42 shows inappropriate connection, then at Steps S49 and S50, an alarm message to that effect is displayed on a display and a countermeasure instruction is accepted. As the contents of this instruction, "forcible execution" for transferring the necessary configuration data only to the connected mixer engines not in use in any other zone and "termination" for terminating the processing associated with the zone selection are provided as options.

Then, at Step S50, the instruction contents are discriminated. If the discrimination turns out "forcible execution", the flow goes to Step S43 and the processing is continued, and if "termination", the processing is finished.

Incidentally, in the case of "forcible execution", it is preferable that the processing from Step S43 through Step S47 is repeated, targeted only at the mixer engines connected to the control network and not belonging to any other zone, out of the mixer engines in the selected zone. The execution of such processing only allows the execution of part of the registered configuration of signal processing in the selected zone, and thus the desired audio signal processing cannot be generally executed. However, in order to respond to a demand for the partial execution, which arises in some cases, this mixer system has the function of "forcible execution". Therefore, this function is not an indispensable one.

The execution of the processing described above makes it possible to set the selected "zone" in the mixer system and to store the necessary configuration data in each mixer engine used in that zone as in the first embodiment.

Figure 17:
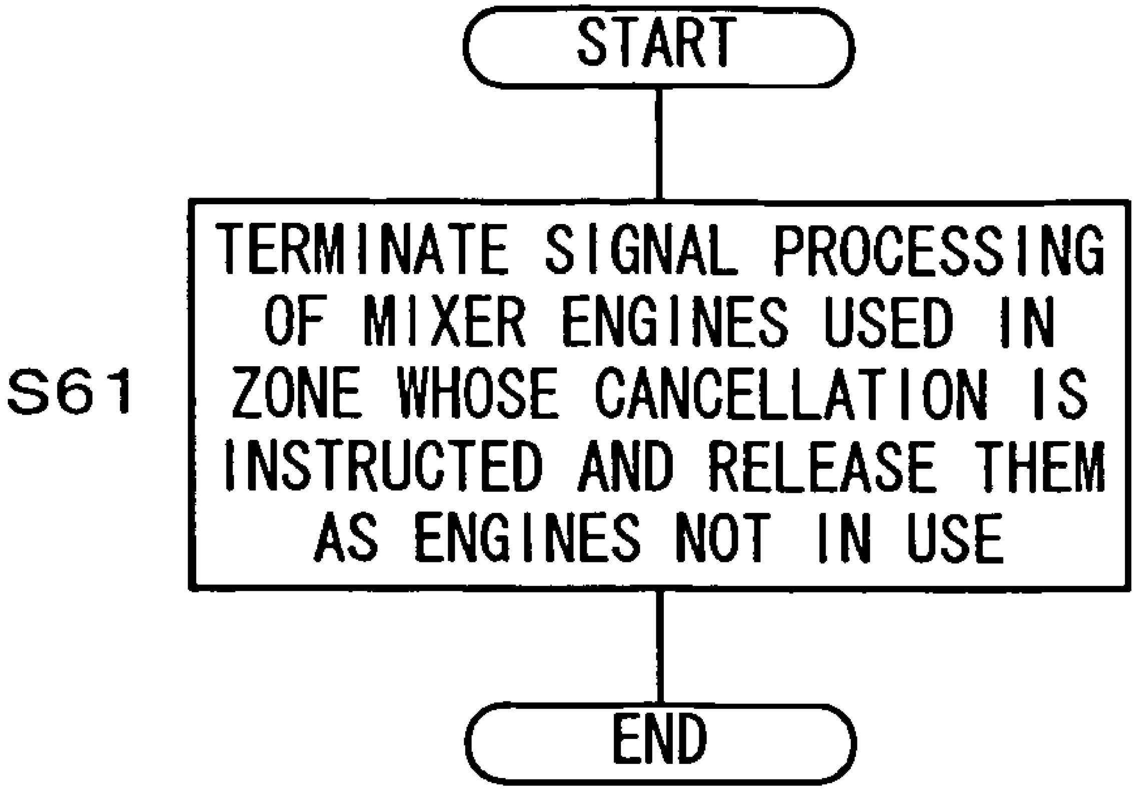
FIG. 17 is a flowchart showing processing when the cancellation of a zone is instructed in the second embodiment.

Processing that is executed when, on the other hand, cancellation of a zone set in the mixer system is instructed will be shown in the flowchart in FIG. 17.

In this processing, the signal processing of the mixer engines used in the zone whose cancellation is instructed is terminated and the data indicating that the mixer engines are in use is erased, so that the mixer engines are released as engines not in use. At this time, it is not necessary to erase the configuration data stored in the mixer engines.

The execution of the processing described above makes it possible to cancel the setting of a "zone", which allows the mixer engines used in this zone to return to a usable state in any other zone.

The selection of scene data, processing executed by the PC 30 in accordance therewith, and processing executed by the mixer engines according to a scene data selection command are the same as those of the first embodiment. Through such processing, for each set zone, each mixer engine in use in this zone can be caused to execute the selected signal processing, using selected parameter values. This can bring about the same effects as those of the first embodiment.

It is a matter of course that the plural zones can be set in one mixer system as long as no same mixer engine to be used is set in the plural zones or "forcible execution" is selected even if some of the engines set in one zone are also set in any other zone. For example, in the example shown in the aforesaid Table 1, zones Z1 and Z2 can be set concurrently, and zones Z1 and Z4 can be also set concurrently. Further, it can be freely set which mixer engines are to be used in each zone. Therefore, also in the mixer system of this embodiment, the cooperative operation of any combination of the plural mixer engines connected to the PC 30 is possible, and the physical connection change is not required for this.

In addition, this embodiment also allows an operation such that after the zone Z2 is set, this setting is cancelled, and the zone Z4 is set. In the above-described first embodiment, the area change is executed for such a change in the zone configuration. In this embodiment, on the other hand, since setting in a unit of a zone is possible, it is not necessary to prepare the whole area data in order to change the zone configuration for a part of the mixer engines, which can reduce a data volume stored in the PC 30.

Further, even while part of the mixer engines is processing audio signals, it is possible to change the system configuration by freely removing or adding the mixer engine not in use in any zone, to thereby set a zone corresponding to the new configuration. Accordingly, the degree of freedom in the configuration change of the system can be also enhanced.

The embodiments of the invention have been described hitherto, but the invention is not limited to the above-described embodiments. For example, instead of storing the set of the configuration number and the operation data number as the scene data as shown in FIG. 6 and so on, the selection of the number of the configuration to be used in each zone may be accepted separately from the selection of the number of the operation data to be used when the signal processing according to this configuration is executed. In this case, it is preferable that the selection of the configuration number is accepted first to get each mixer engine ready to execute the signal processing according to the selected configuration, and thereafter, the selection of the operation data number is accepted to thereby designate the values of the parameters to be used in the processing.

However, such separate selection of the configuration number and the operation data number requires confirming the change of the configuration data and selecting the operation data number along with the selection of the configuration number when necessary, while in the scene change previously described, on the other hand, a user can change the configuration data (CAD data) and select the preset operation data in the changed configuration data with one operation simply by selecting the scene data, unaware of whether the configuration data is changed or not.

Further, as the controller of the mixer system, a controller for exclusive purpose may be used instead of the PC 30. Besides, any necessary modification of the data format, the contents of the processing, and the hardware configuration may be appropriately made. The mixer engine storing the zone data may be operated in a state in which it is separated from the controller.

Moreover, instead of using the concepts of "area" and "zone" as described above, the plural mixer engines may be connected in cascade as described in Owner's Manual of the aforesaid digital mixing engine "DME32". Further, only one mixer engine may be provided in the mixer system.

As has been described hitherto, according to the invention, it is possible to provide an audio signal processing system including: a plurality of audio signal processing devices for processing audio signals according to a designated configuration of signal processing; and a controller for controlling the operations of the respective audio signal processing devices, in which cooperative operation of any combination of the audio signal processing devices in the system is enabled while maintaining operability. Therefore, applying this invention makes it possible to provide an audio signal processing system with high degree of freedom of control.

Further, according to the invention, it is possible to provide an audio signal processing device including a signal processor for processing audio signals according to a designated configuration of signal processing, in which operability and responsiveness in changing the configuration of signal processing can be improved. Therefore, applying the invention makes it possible to provide an audio signal processing device with high operability.

TABLE 1

| zone number | ID of mixer engine belonging to zone |
|---|---|
| Z1 | E1, E2 and E3 |
| Z2 | E4 and E5 |
| Z3 | E1, E2, E3 and E4 |
| Z4 | E5 |
| . . . | . . . |

What is claimed is:

1. An audio signal processing system comprising:

a plurality of audio signal processing devices each processing an audio signal;

a controller controlling operations of said respective audio signal processing devices; and a network which connects each of said plurality of audio signal processing devices and said controller, wherein each of said plurality of audio signal processing devices functions as one processing block that executes audio signal processing and any combination of one or more audio signal processing devices among said plurality of audio signal processing devices cooperatively execute an audio signal processing under control of said controller, wherein said controller comprises:

a memory that stores, as each of a plurality of zone data, specifying data, a plurality of configuration data, and one or more scene data, the specifying data specifying one or more audio signal processing devices which cooperatively execute the audio signal processing out of said plurality of audio signal processing devices, each of the plurality of configuration data indicating, for each of said one or more specified audio signal processing devices, components and wires between the components corresponding to a configuration of signal processing to be executed by said specified audio signal processing device as the processing block, and each of the scene data indicating an audio signal processing which corresponds to each of the one or more specified audio signal processing devices;

a selecting device that selects the zone data;

a checking device that checks, in response to selection of the zone data by said selecting device, that said one or more audio signal processing devices specified by the specifying data in the selected zone data are prepared for audio signal processing as a processing block in the cooperative audio signal processing based on the selected zone data;

a transferring device that transfers, to each of said one or more audio signal processing devices that are confirmed as prepared by said checking device, portions of configuration data corresponding to the audio signal processing device among the configuration data included in the selected zone data;

an accepting device that accepts, in a state where transmission of the configuration data has been completed regarding one zone data, selection of the scene data included in the selected zone data; and an instructing device that, in response to the acceptance of the selection of the scene data by said accepting device, instructs said one or more audio signal processing devices specified by the specifying data included in the zone data in which the selected scene data is included, to execute the audio signal processing corresponding to the selected scene data, and wherein each of said audio signal processing devices comprises:

a memory that stores the portions of the configuration data transferred from said controller; and a processor that, in response to the instruction by said controller to execute the audio signal processing corresponding to a given scene data, executes the audio signal processing configured of the components and the wires between the components indicated by the configuration data corresponding to the given scene data.

2. An audio signal processing system comprising:

a plurality of audio signal processing devices each processing an audio signal;

a controller controlling operations of said respective audio signal processing devices; and a network which connects each of said plurality of audio signal processing devices and said controller, wherein each of said plurality of audio signal processing devices functions as one processing block that executes audio signal processing and any combination of one or more audio signal processing devices among said plurality of audio signal processing devices cooperatively execute an audio signal processing under control of said controller, wherein said controller comprises:

a memory that stores, as each of a plurality of zone data, specifying data, a plurality of configuration data, a plurality of operation data and one or more scene data, the specifying data specifying one or more audio signal processing devices which cooperatively execute the audio signal processing out of said plurality of audio signal processing devices, the plurality of configuration data indicating, for each of said one or more specified audio signal processing devices, components and wires between the components corresponding to a configuration of signal processing to be executed by said specified audio signal processing device as the processing block, each of the plurality of operation data indicating a value of a parameter used in each of the one or more audio signal processing devices specified by the specifying data when executing the audio signal processing configured of the components and the wires between the components indicated by the configuration data, and each of the scene data indicating an audio signal processing which corresponds to each of the one or more specified audio signal processing devices;

a selecting device that selects the zone data;

a checking device that checks, in response to selection of the zone data by said selecting device, that said one or more audio signal processing devices specified by the specifying data in the selected zone data are prepared for audio signal processing as a processing block in the cooperative audio signal processing based on the selected zone data;

a transferring device that transfers, to each of said one or more audio signal processing devices that are confirmed as prepared by said checking device, portions of configuration data and operation data corresponding to the audio signal processing device among the configuration data included in the selected zone data;

an accepting device that accepts, in a state where transmission of the configuration data and the operation data has been completed regarding one zone data, selection of the scene data included in the selected zone data; and an instructing device that, in response to the acceptance of the selection of the scene data by said accepting device, instructs said one or more audio signal processing devices specified by the specifying data included in the zone data in which the selected data is included, to execute the audio signal processing corresponding to the selected scene data using the value of the parameter indicated by operation data corresponding to the selected scene data, and wherein each of said audio signal processing devices comprises:

a memory that stores the portions of the configuration data and the operation data transferred from said controller; and a processor that, in response to the instruction by said controller to execute the audio signal processing corresponding to a given scene data, executes the audio signal processing configured of the components and the wires between the components indicated by the configuration data corresponding to the given scene data, using the value of the parameter indicated by the portions of operation data corresponding to the given scene data.

3. An audio signal processing system according to claim 1, wherein said controller further comprises an alarm device that notifies a user of an unprepared state when at least one of said audio signal processing devices specified by the specifying data in the zone data selected by said selecting device is not prepared for audio signal processing as the processing block in the cooperative audio signal processing based on the selected zone data.

4. An audio signal processing system according to claim 2, wherein said controller further comprises an alarm device that notifies a user of an unprepared state when at least one of said audio signal processing devices specified by the specifying data in the zone data selected by said selecting device is not prepared for audio signal processing as the processing block in the cooperative audio signal processing based on the selected zone data.

5. An audio signal processing device provided with a signal processor executing audio signal processing, comprising:

a configuration data memory that stores a plurality of configuration data each indicating selection and combination of components used for the audio signal processing, and wires between the components;

an operation data memory that stores a plurality of operation data each corresponding to one of the plurality of the configuration data and indicating a value of a parameter used in executing the audio signal processing configured of the combination of the components and the wires between the components indicated by the corresponding configuration data;

a scene data memory that stores a plurality of scene data each including first specifying data specifying one piece of the configuration data stored in said configuration data memory, and second specifying data specifying one piece of the operation data stored in said operation data memory and corresponding to the configuration data specified by the first specifying data;

a signal processing controller that controls said signal processor to execute audio signal processing configured of combination of the components and wires between the components indicated by current configuration data selected out of the configuration data stored in said configuration data memory;

a current memory that stores operation data indicating a value of a parameter used in executing the audio signal processing configured of the combination of the components and the wires between the components indicated by the current configuration data;

an operation data supplier that supplies the operation data stored in said memory to said signal processor which executed the audio signal processing;

a recall instruction accepting device that accepts an instruction that one piece of the scene data should be recalled from said scene data memory; and a store instruction accepting device that accepts a store instruction that one piece of scene data should be stored in said scene data memory;

a recall device that, in response to the acceptance of the recall instruction by said recall instruction accepting device, causes said signal processor to execute audio signal processing indicated by the configuration data specified by the first specifying data included in the scene data for which recall is instructed, by recalling the configuration data as the current configuration data, and recalls operation data specified by the second specifying data included in the scene data for which recall is instructed, to store the operation data into said current memory; and a store device that, in response to the acceptance of the store instruction by said store instruction accepting device, stores scene data including the first specifying data which specifies the current configuration data and the second specifying data which specifies the operation data stored in said current memory, into said scene data memory.

6. An audio signal processing device according to claim 5, wherein when said store instruction accepting device accepts the store instruction, i) if the operation data stored in said current memory has been already associated with the current operation data and stored in said operation data memory, said store device stores scene data including the first specifying data which specifies the current configuration data and the second specifying data which specifies the stored operation data, ii) and otherwise said store device stores the operation data stored in said current memory into said operation data memory as new operation data, and stores scene data including the first specifying data which specifies the current configuration data and the second specifying data which specifies the stored new operation data.

* * * * *